US012750718B2

(12) United States Patent
Kishida et al.

(10) Patent No.: US 12,750,718 B2
(45) Date of Patent: Sep. 29, 2026

(54) ACCESS POINT AND WIRELESS TERMINAL APPARATUS

(71) Applicant: NTT, Inc., Tokyo (JP)

(72) Inventors: Akira Kishida, Musashino (JP); Kengo Nagata, Musashino (JP); Shoko Shinohara, Musashino (JP); Hanae Otani, Musashino (JP); Yusuke Asai, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 290 days.

(21) Appl. No.: 18/294,349

(22) PCT Filed: Aug. 18, 2021

(86) PCT No.: PCT/JP2021/030176
§ 371 (c)(1),
(2) Date: Feb. 1, 2024

(87) PCT Pub. No.: WO2023/021609
PCT Pub. Date: Feb. 23, 2023

(65) Prior Publication Data
US 2024/0340685 A1 Oct. 10, 2024

(51) Int. Cl.
*H04W 28/02* (2009.01)
*H04W 52/02* (2009.01)

(52) U.S. Cl.
CPC ... *H04W 28/0221* (2013.01); *H04W 28/0278* (2013.01); *H04W 52/0216* (2013.01)

(58) Field of Classification Search
CPC ......... H04W 28/0221; H04W 28/0278; H04W 52/0216; H04W 76/15; H04W 76/28;
(Continued)

(56) References Cited

U.S. PATENT DOCUMENTS

| | | | | |
|---|---|---|---|---|
| 12,414,043 | B2 * | 9/2025 | Kim | H04W 52/02 |
| 2018/0092039 | A1 | 3/2018 | Cariou et al. | |

(Continued)

FOREIGN PATENT DOCUMENTS

| | | | |
|---|---|---|---|
| CN | 112788716 | | 5/2021 |
| EP | 4191147 | A1 | 6/2023 |
| EP | 4192147 | A1 | 6/2023 |

OTHER PUBLICATIONS

International Preliminary Report on Patentability in International Appln. No. PCT/JP2021/030176, mailed on Feb. 13, 2024, 9 pages (with English translation).

(Continued)

*Primary Examiner* — Brian T O Connor
(74) *Attorney, Agent, or Firm* — Fish & Richardson P.C.

(57) ABSTRACT

An access point of an embodiment includes first and second wireless signal processing units and a link management unit. The link management unit establishes a multi-link with a first wireless terminal apparatus using the first and second wireless signal processing units. The link management unit is capable of setting at least the multi-link to a first operation mode and sets the first and second wireless signal processing units to an intermittent operation mode in the first operation mode. When the multi- link is set to the first operation mode and first data addressed to the first wireless terminal apparatus is input, the link management unit causes at least one wireless signal processing unit associated with a traffic identifier attached to the first data to transmit a beacon signal including information indicating that the first data has been buffered.

17 Claims, 16 Drawing Sheets

(58) Field of Classification Search
CPC ..... H04W 84/12; H04W 52/02; H04W 28/04; H04W 72/04; H04W 88/06; H04W 88/10; Y02D 30/70
See application file for complete search history.

(56) References Cited

U.S. PATENT DOCUMENTS

| | | | | |
|---|---|---|---|---|
| 2020/0374801 | A1 | 11/2020 | Chu et al. | |
| 2023/0284144 | A1* | 9/2023 | Kim | H04W 52/0235 370/338 |
| 2023/0354160 | A1 | 11/2023 | Gan | |
| 2024/0031853 | A1* | 1/2024 | Shirakawa | H04W 76/15 |
| 2025/0031262 | A1* | 1/2025 | Fang | H04W 76/20 |

OTHER PUBLICATIONS

[No Author Listed], "Part 11: Wireless LAN Medium Access Control (MAC) and Physical Layer (PHY) Specifications," IEEE Standards Association, Dec. 2016, IEEE Std 802.11-2016, 25 pages.

* cited by examiner

Fig. 3

AID = #1

| STA FUNCTION (LINK ID) | LINK | FREQUENCY BAND | CHANNEL ID | MULTI-LINK | TID | STATUS |
|---|---|---|---|---|---|---|
| STA1 | PRESENCE | 6GHz | CH1 | ○ | #1,#2 | INTERMITTENT OPERATION |
| STA2 | PRESENCE | 5GHz | CH2 | ○ | #1,#3 | SLEEP |
| STA3 | ABSCENCE | 2.4GHz | – | – | – | |

Fig. 10

| | | | | | |
|---|---|---|---|---|---|
| ... | AID#1 | PVB OF AID#1 | AID#2 | PVB OF AID#2 | ... |

ACCESS POINT AND WIRELESS TERMINAL APPARATUS

CROSS-REFERENCE TO RELATED APPLICATIONS

This application is a National Stage application under 35 U.S.C. § 371 of International Application No. PCT/JP2021/030176, having an International Filing Date of Aug. 18, 2021.

The disclosure of the prior application is considered part of the disclosure of this application, and is incorporated by reference in its entirety into this application.

TECHNICAL FIELD

Embodiments relate to an access point and a wireless terminal apparatus.

BACKGROUND ART

A wireless local area network (LAN) is known as an information communication system that wirelessly connects a an access point and a wireless terminal apparatus.

CITATION LIST

Non Patent Literature

Non Patent Literature 1: IEEE Std 802.11-2016, "9.3.3.3 Beacon frame format" and "11.1 Synchronization," 7 Dec. 2016

SUMMARY OF INVENTION

Technical Problem

An object of the present invention is to improve the reliability of data communication during a multi-link power saving mode.

Means for Solution to Problem

An access point of an embodiment includes a first wireless signal processing unit, a second wireless signal processing unit, and a link management unit. The link management unit establishes a multi-link with a first wireless terminal apparatus using the first wireless signal processing unit and the second wireless signal processing unit. The link management unit is capable of setting at least the multi-link to a first operation mode and sets the first wireless signal processing unit and the second wireless signal processing unit to an intermittent operation mode in the first operation mode. When the multi-link is set to the first operation mode and first data addressed to the first wireless terminal apparatus is input, the link management unit causes at least one wireless signal processing unit associated with a traffic identifier attached to the first data to transmit a beacon signal including information indicating that the first data has been buffered.

Advantageous Effects of Invention

The access point of the embodiment can improve the efficiency of data communication during a multi-link power saving mode.

BRIEF DESCRIPTION OF DRAWINGS

FIG. 3 is a table showing an example of link states of a base station and a wireless terminal apparatus included in the information communication system according to the first embodiment.

FIG. 10 is a conceptual diagram showing an example of the format of a beacon signal used during a multi-link power saving mode in the information communication system according to the first embodiment.

DESCRIPTION OF EMBODIMENTS

Figure 1:
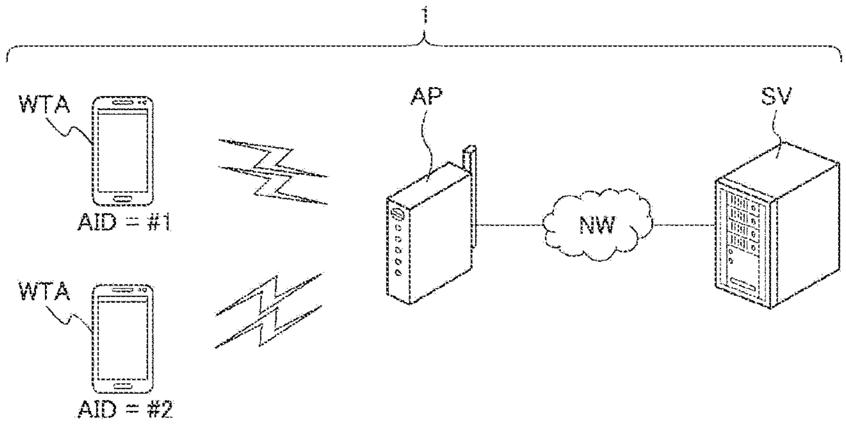
FIG. 1 is a conceptual diagram showing an example of the overall configuration of an information communication system according to a first embodiment.

An information communication system according to an embodiment will be described below with reference to the drawings. Each embodiment illustrates an apparatus or method for embodying the technical idea of the invention. The drawings may be schematic or conceptual. In the following description, components having substantially the same function and configuration are denoted by the same reference numerals. The numbers following the letters that constitute the reference numerals are used to distinguish between elements that are referred to by reference numerals including the same letters and have the same configuration. Similarly, each of the letters following the number and the "hyphen+number" that constitute the reference number are used to distinguish between elements that are referred to by the reference numerals including the same numbers and have the same configuration. If there is no need to distinguish between elements indicated by reference signs including the same letters or numbers, these elements are referred to by reference signs including only letters or numbers.

<1> First Embodiment

An information communication system 1 according to the first embodiment will be described below.

<1-1> Configuration

<1-1-1> Overall Configuration

FIG. 1 is a conceptual diagram showing an example of the overall configuration of the information communication system 1 according to the first embodiment. As shown in FIG. 1, the information communication system 1 includes, for example, a base station (Access Point) AP, at least one wireless terminal apparatus (WTA), and a server SV.

The base station AP is a wireless LAN access point or wireless LAN router, and is configured to be connectable to a network NW. The base station AP is configured to be wirelessly connectable to one or more wireless terminal apparatuses WTA using one type of band or a plurality of types of bands. The base station AP may be wirelessly connected to a wireless repeater (in other words, a wireless range extender, a relay station, or a repeater), or may be wirelessly connected to both the wireless terminal apparatus WTA and the wireless repeater.

The wireless terminal apparatus WTA is a wireless terminal such as a smartphone or a tablet computer. The wireless terminal apparatus WTA is configured to be wirelessly connectable to the base station AP. The base station AP identifies a plurality of wirelessly connected wireless terminal apparatuses WTA by means of terminal identifiers AID. In this example, a wireless terminal apparatus WTA with AID=#1 and a wireless terminal apparatus WTA with AID=#2 are connected to the base station AP. Note that the wireless terminal apparatus WTA may be another electronic device such as a desktop computer or a laptop computer.

The server SV is a computer configured to be connectable to the network NW, and configured to be communicable with the base station AP via the network NW. The server SV stores, for example, content data intended for the wireless terminal apparatus WTA. The server SV can transmit and receive data to and from the wireless terminal apparatus WTA via the base station AP. Wireless communication may be used for communication between the base station AP and the server SV, or a combination of wireless communication and wired communication may be used.

Wireless communication between the base station AP and the wireless terminal apparatus WTA conforms to the IEEE802.11 standard. The IEEE802.11 standard defines the MAC sublayers of Layer 1 and Layer 2 of the Open Systems Interconnection (OSI) reference model. In the OSI reference model, communication functions are divided into seven layers (Layer 1: the physical layer, Layer 2: the data link layer, Layer 3: the network layer, Layer 4: the transport layer, Layer 5: the session layer, Layer 6: the presentation layer, and Layer 7: the application layer). The data link layer includes, for example, a logical link control (LLC) layer and a media access control (MAC) layer. The LLC layer also adds a destination service access point (DSAP) header and a source service access point (SSAP) header and so forth to data input from a higher application for example, thereby forming LLC packets. The MAC layer adds an MAC header to an LLC packet, for example, to form an MAC frame. In this description, the processing for the MAC sub-layers of the first layer and the second layer regulated by the IEEE 802.11 standard is mainly described, and the description for the processing for the other layers is omitted.

A multi-link may be used for the wireless connection between the base station AP and the wireless terminal apparatus WTA. A multi-link is a wireless connection that can transmit and receive data using a plurality of links. In a pair of a wirelessly connected base station AP and a wireless terminal apparatus WTA, one operates as a transmitting station and the other operates as a receiving station. A transmitting station can transmit a wireless signal including data input from an upper application using at least one link constituting a multi-link. A receiving station can receive a wireless signal transmitted by a transmitting station and reconstruct data included in the wireless signal using at least one link constituting a multi-link. In this specification, a case where the base station AP operates as a transmitting station and the wireless terminal apparatus WTA operates as a receiving station will be described.

(Frequency Band Used by Base Station AP and Wireless Terminal Apparatus WTA)

Figure 2:
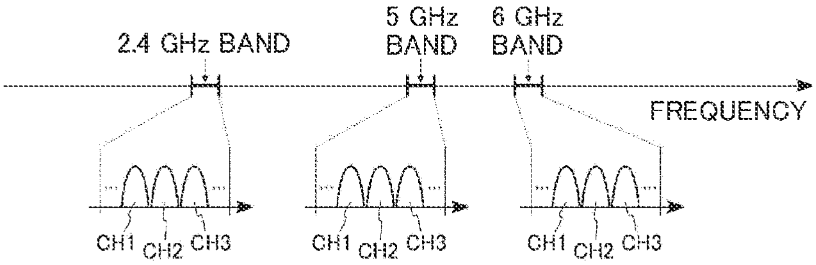
FIG. 2 is a conceptual diagram showing an example of frequency bands used in wireless communication in the information communication system according to the first embodiment.

FIG. 2 is a conceptual diagram showing an example of frequency bands used for wireless communication in the information communication system 1 according to the first embodiment. As shown in FIG. 2, in wireless communication between the base station AP and the wireless terminal apparatus WTA, for example, 2.4 GHZ, 5 GHZ and 6 GHz bands are used. Each frequency band includes a plurality of channels. In this example, each of the 2.4 GHz band, the 5 GHz band, and the 6 GHz band includes at least three channels CH1, CH2, and CH3. Note that frequency bands other than the 2.4 GHz band, 5 GHz band, and 6 GHz band may be used for wireless communication, and at least one channel CH may be assigned to each frequency band. In multi-link, two or more channels CH are used. A plurality of channels CH used in multi-link may be in the same frequency band or in different frequency bands.

Example of Link State

FIG. 3 is a table showing an example of link states of the base station AP and the wireless terminal apparatus WTA provided in the information communication system 1 according to the first embodiment. The table is provided, for example, in a link management unit of the base station AP. The base station AP and the wireless terminal apparatus WTA manage the link state using, for example, the table shown in FIG. 3. Hereinafter, the table for managing the state of multi-link will be referred to as "link management information." Note that the base station AP may have link management information for each AID of the wireless terminal apparatus WTA, or may manage link states for each of a plurality of AIDs with one piece of link management information. As shown in FIG. 3, for example, the link management information associated with AID=#1 includes "STA function," "link," "frequency band," "channel ID," "multi-link," "TID (Traffic IDentifier)" and "Status."

The STA function is a wireless signal processing unit provided in each of the base station AP and the wireless terminal apparatus WTA, and the STA functions of the base station AP and the wireless terminal apparatus WTA are paired to form one link. Each STA function may use one or more channels, but in the present embodiment, it is assumed that one channel is used. Each of the base station AP and wireless terminal apparatus WTA may have a plurality of STA functions. "STA function (Link ID)" in FIG. 3 indicates the STA function assigned to the wireless terminal apparatus WTA that has established the link. In this example, three STA functions (STA1, STA2, and STA3) are assigned to wireless communication between the wireless terminal apparatus WTA with AID=#1 and the base station AP. STA1, STA2, and STA3 of the base station AP are associated with STA1, STA2, and STA3 of the wireless terminal apparatus WTA, respectively.

"Frequency band" and "Channel ID" in FIG. 3 indicate the frequency band and channel ID used for the link, respectively. In "Multi-link" in FIG. 3, STA functions marked with "O" are links used for multi-link. Specifically, STA1 of each of the base station AP and the wireless terminal apparatus WTA is associated with channel CH1 in the 6 GHz band. STA2 of each of the base station AP and the wireless terminal apparatus WTA is associated with channel CH2 in the 5 GHz band. STA1 and STA2 of the base station AP and the wireless terminal apparatus WTA are in a linked state and have established multi-links. STA3 of each of the base station AP and the wireless terminal apparatus WTA is associated with the 2.4 GHz band and is in a non-linked state.

The TID is an identifier that indicates the type of traffic (data). Each STA function transmits and receives traffic on the TID assigned thereto. Traffic types include, for example, "VO (Voice)," "VI (Video)," "BE (Best Effort)," and "BK (Background)." "TID" in FIG. 3 indicates the type of traffic assigned to the link. In multi-link, one STA function may be assigned to one TID, or a plurality of STA functions may be assigned to one TID. In this example, TID #1 is assigned to STA1 and STA2 of each of the base station AP and the wireless terminal apparatus WTA. TID #2 is assigned to STA1 of each of the base station AP and the wireless terminal apparatus WTA. TID #3 is assigned to STA2 of each of the base station AP and the wireless terminal apparatus WTA. Each of TID #1 to TID #3 corresponds to one of VO, VI, BE, and BK.

Traffic and STA functions are associated when a multi-link is established between a base station AP and a wireless terminal apparatus WTA. For example, the association between traffic and STA functions is set so that the traffic volume (data volume) is even among a plurality of links constituting the multi-link. The present invention is not limited thereto and similar types of traffic (priority/non-priority or the like) may be collected in a specific link constituting the multi-links. It is preferable that the frequency band allocated for traffic transmission/reception be selected according to the type of traffic and the amount of data. For example, voice (VO) with a small amount of data may be associated with the frequency band of 2.4 GHZ, and video (VI) with a large amount of data may be associated with the frequency band of GHZ.

"Status" in FIG. 3 indicates the status of the STA function. The status of the STA function includes, for example, "active mode," "intermittent operation mode," and "sleep mode." The active mode corresponds to a state in which the STA function of the wireless terminal apparatus WTA maintains the Awake state and wireless signals can be transmitted and received at any time. The intermittent operation mode corresponds to a state in which the STA function of the wireless terminal apparatus WTA operates intermittently by repeating the Awake state and Doze state. The sleep mode corresponds to a state in which the STA function of the wireless terminal apparatus WTA maintains the Doze state and wireless signals cannot be transmitted or received. The sleep mode may be regarded as the intermittent operation mode in which a restart deadline (a period in which the Awake state is set) is not provided. The Awake state corresponds to a state in which wireless signals can be transmitted and received. The Doze state corresponds to a state in which wireless signals cannot be transmitted or received. In the Doze state, the supply of power to the circuit related to the STA function is appropriately cut off. Therefore, power consumption of the STA function is smaller in the order of the active mode, the intermittent operation mode, and the sleep mode.

In the information communication system 1, the base station AP can set the established multi-link to a normal operation mode or a multi-link power saving mode. Multi-links in the normal operation mode are configured by STA functions (links) in the active mode. The multi-link power saving mode is configured by at least one link in the active mode or the intermittent operation mode and other links set in the intermittent operation mode or the sleep mode. Note that although the base station AP or the wireless terminal apparatus WTA can be used for communication, there may be links that are not included in a link set of the multi-link between them (Disabled links).

<1-1-2> Hardware Configuration

The hardware configurations of the base station AP and the wireless terminal apparatus WTA will be described below.

(Hardware Configuration of Base Station AP)

Figure 4:
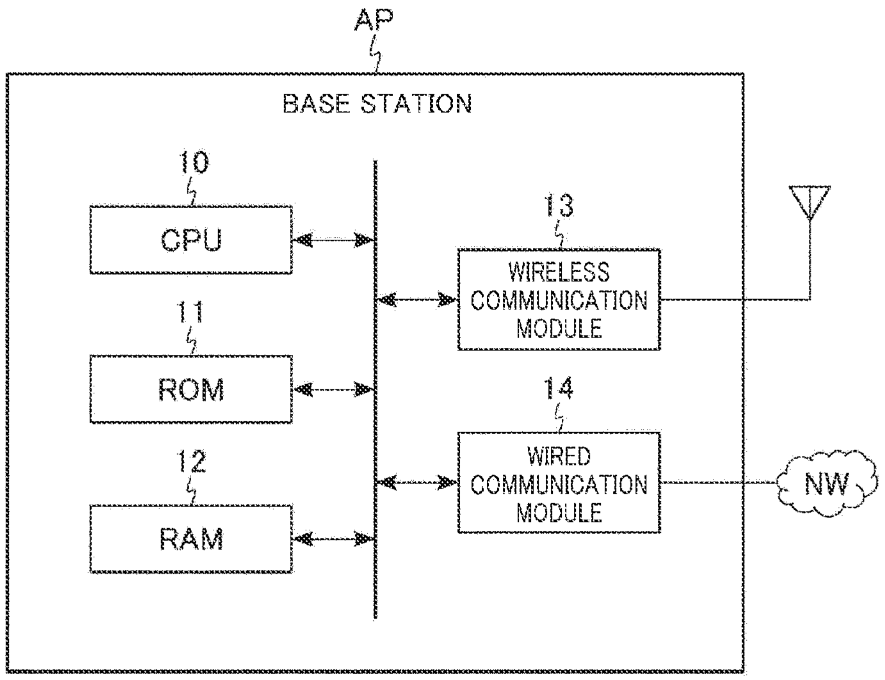
FIG. 4 is a block diagram showing an example of a hardware configuration of a base station included in the information communication system according to the first embodiment.

FIG. 4 is a block diagram showing an example of the hardware configuration of the base station AP included in the information communication system 1 according to the first embodiment. As illustrated in FIG. 4, the base station AP includes, for example, a central processing unit (CPU) 10, a read-only memory (ROM) 11, a random access memory (RAM) 12, a wireless communication module 13, and a wired communication module 14.

The CPU 10 is an integrated circuit capable of executing various programs and controls the overall operation of the base station AP. The ROM 11 is a non-volatile semiconductor memory and stores programs, control data, and the like for controlling the base station AP. The RAM 12 is, for example, a volatile semiconductor memory and is used as a working area for the CPU 10. The wireless communication module 13 is a circuit used for transmitting and receiving data by wireless signals, and is configured to be connectable to an antenna. The wireless communication module 13 includes a plurality of communication modules respectively corresponding to a plurality of frequency bands. The wired communication module 14 is a circuit used for transmitting and receiving data by wired signals, and is configured to be connectable to the network NW. Note that the base station AP may have other hardware configurations. For example, when the base station AP is wirelessly connected to the network NW, the wired communication module 14 may be omitted from the base station AP.

(Hardware Configuration of Wireless Terminal Apparatus WTA)

Figure 5:
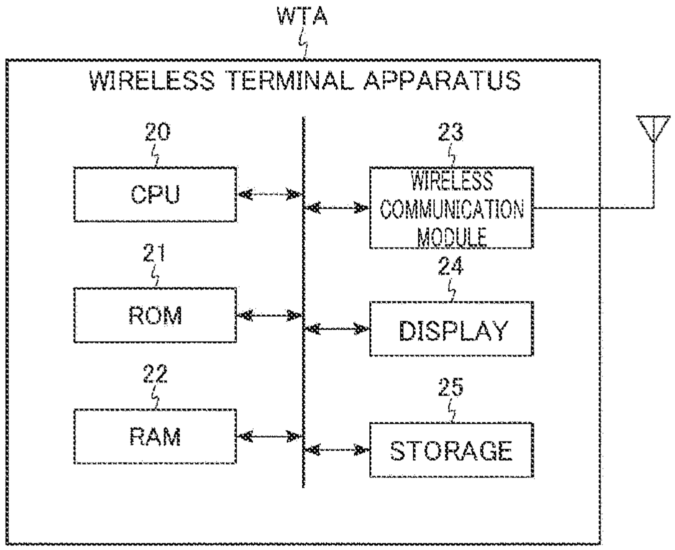
FIG. 5 is a block diagram showing an example of a hardware configuration of a wireless terminal apparatus included in the information communication system according to the first embodiment.

FIG. 5 is a block diagram showing an example of the hardware configuration of the wireless terminal apparatus WTA included in the information communication system 1 according to the first embodiment. As shown in FIG. 5, the wireless terminal apparatus WTA includes a CPU 20, a ROM 21, a RAM 22, a wireless communication module 23, a display 24, and a storage 25, for example.

The CPU 20 is an integrated circuit capable of executing various programs and controls the overall operation of the wireless terminal apparatus WTA. The ROM 21 is a non-volatile semiconductor memory and stores programs, control data, and the like for controlling the wireless terminal apparatus WTA. The RAM 22 is, for example, a volatile semiconductor memory and is used as a working area of the CPU 20. The wireless communication module 23 is a circuit used for transmitting and receiving data by wireless signals, and is configured to be connectable to an antenna. The wireless communication module 23 may include, for example, a plurality of communication modules respectively corresponding to a plurality of frequency bands. The display 24 displays, for example, a GUI (Graphical User Interface) corresponding to application software. The display 24 may have a function as an input interface for the wireless terminal apparatus WTA. The storage 25 is a non-volatile storage device, and stores, for example, system software of the wireless terminal apparatus WTA. Note that the wireless terminal apparatus WTA may have other hardware configurations. For example, when the wireless terminal apparatus WTA is an IoT (Internet of Things) terminal or the like, the display 24 may be omitted from the wireless terminal apparatus WTA.

<1-1-3> Functional Configuration

The functional configuration of each of the base station AP and the wireless terminal apparatus WTA will be described below.

(Functional Configuration of Base Station AP)

Figure 6:
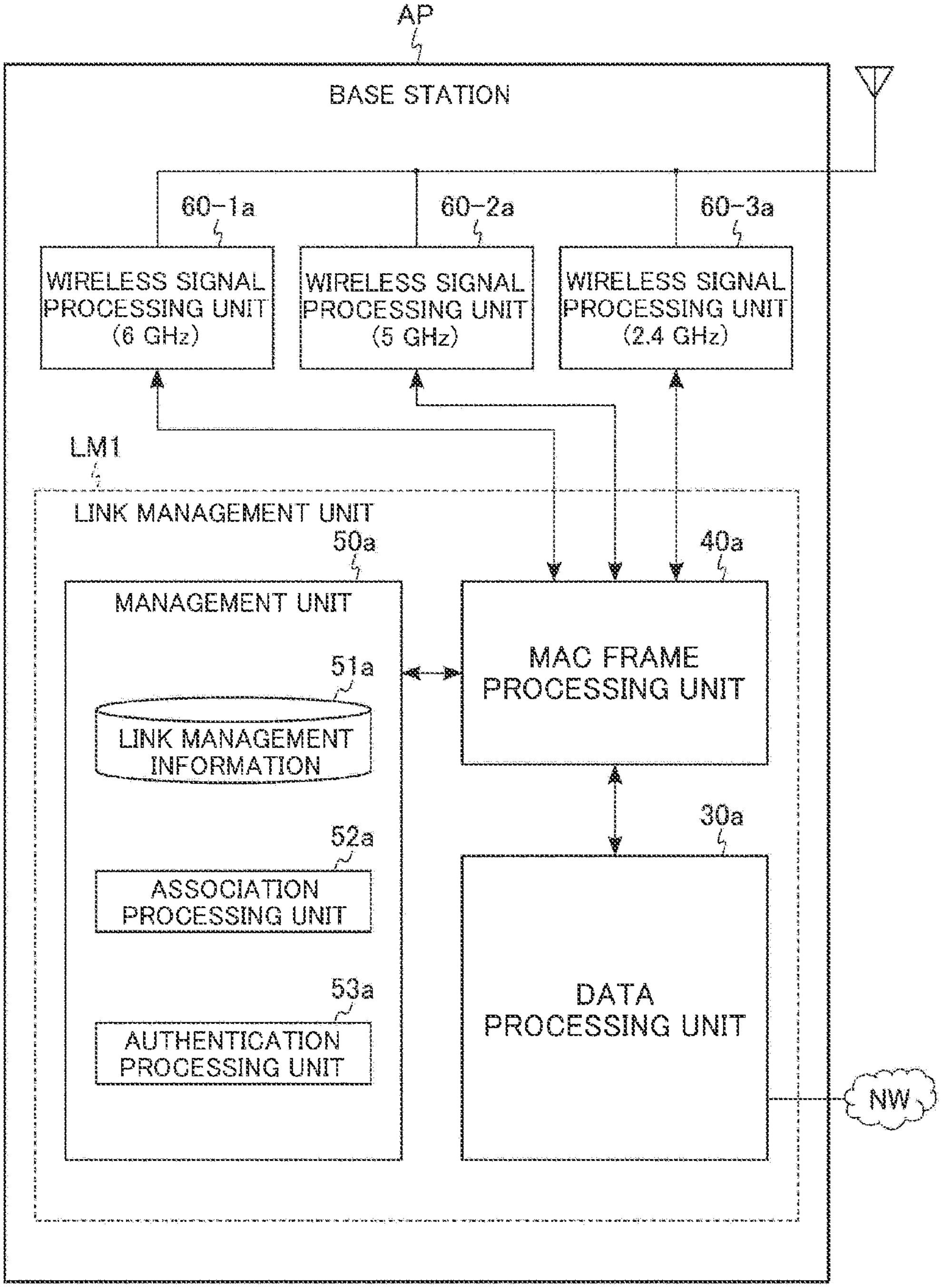
FIG. 6 is a block diagram showing an example of a functional configuration of a base station included in the information communication system according to the first embodiment.

FIG. 6 is a block diagram showing an example of the functional configuration of the base station AP included in the information communication system 1 according to the first embodiment. The base station AP includes, for example, a data processing unit 30*a*, a MAC frame processing unit 40*a*, a management unit 50*a*, and wireless signal processing units 60-1*a*, 60-2*a* and 60-3*a*. The processing of the data processing unit 30*a*, the MAC frame processing unit 40*a*, the management unit 50*a*, and the wireless signal processing units 60-1*a*, 60-2*a* and 60-3*a* are implemented by the CPU 10 and the wireless communication module 13, for example.

The data processing unit 30*a* can perform LLC layer and upper layer processing on input data. When the base station AP is the transmitting station, the data processing unit 30*a* inputs data input from the server SV via the network NW to the MAC frame processing unit 40*a*. When the base station AP is the receiving station, the data processing unit 30*a* transmits the data input from the MAC frame processing unit 40*a* to the server SV via the network NW.

The MAC frame processing unit 40*a* performs part of the MAC layer processing on the input data. When the base station AP is the transmitting station, the MAC frame processing unit 40*a* generates MAC frames from the data input from the data processing unit 30*a*. When the base station AP is the receiving station, the MAC frame processing unit 40*a* reconstructs data from MAC frames input from each of the wireless signal processing units 60-1*a*, 60-2*a* and 60-3*a*. The MAC frame processing unit 40*a* can also execute processing based on instructions from the management unit 50*a* and exchange information with the management unit 50*a*.

The management unit 50*a* manages the state of the link with the wireless terminal apparatus WTA based on the notifications received from the wireless signal processing units 60-1*a*, 60-2*a* and 60-3*a* via the MAC frame processing unit 40*a*. The management unit 50*a* includes link management information 51*a*, an association processing unit 52*a*, and an authentication processing unit 53*a*. The link management information 51*a* is stored in the RAM 12, for example, and includes information on the wireless terminal apparatus WTA wirelessly connected to the base station AP. The association processing unit 52*a* executes a protocol related to association when receiving a connection request from the wireless terminal apparatus WTA via any one of the wireless signal processing units 60-1*a*, 60-2*a*, and 60-3*a*. The authentication processing unit 53*a* executes a protocol related to authentication in succession to the connection request.

Each of the wireless signal processing units 60-1*a*, 60-2*a*, and 60-3*a* transmits and receives data between the base station AP and the wireless terminal apparatus WTA by wireless communication. Specifically, each of the wireless signal processing units 60-1*a*, 60-2*a*, and 60-3*a* can execute part of MAC layer processing and first layer processing on input data or wireless signals. When the base station AP is the transmitting station, each of the wireless signal processing units 60-1*a*, 60-2*a*, and 60-3*a* adds a preamble, PHY (physical layer) header, and the like to the data input from the MAC frame processing unit 40*a* to create a wireless frame. Then, each of the wireless signal processing units 60-1*a*, 60-2*a*, and 60-3*a* converts the wireless frame into a wireless signal and distributes the converted wireless signal via the antenna of the base station AP. When the base station AP is the receiving station, each of the wireless signal processing units 60-1*a*, 60-2*a* and 60-3*a* converts wireless signals received via the antenna of the base station AP into wireless frames. Then, each of the wireless signal processing units 60-1*a*, 60-2*a*, and 60-3*a* inputs the data included in the wireless frame to the MAC frame processing unit 40*a*. Note that the wireless signal processing units 60-1*a*, 60-2*a*, and 60-3*a* may or may not share the antenna of the base station AP. In this example, the wireless signal processing units 60-1*a*, 60-2*a* and 60-3*a* handle wireless signals in the 6 GHz band, 5 GHz band and 2.4 GHz band, respectively. That is, the wireless signal processing units 60-1*a*, 60-2*b*, and 60-3*b* correspond to STA1, STA2, and STA3 of the base station AP, respectively.

A set of the data processing unit 30*a*, the MAC frame processing unit 40*a*, and the management unit 50*a* provided in the base station AP is hereinafter referred to as a "link management unit LM1." The link management unit LM1 can determine association between traffic and STA functions when establishing multi-links between the base station AP and the wireless terminal apparatus WTA. The link management unit LM1 manages the state of the STA function (active, intermittent operation, sleep) of the wirelessly connected wireless terminal apparatus WTA for each AID. The link management unit LM buffers the data for each TID of each wireless terminal apparatus WTA, that is, stores the data for each TID in a buffer memory (for example, the RAM 12). When the link management unit LM1 acquires data from an upper layer, the link management unit LM1 transmits the data using one of the STA function links constituting the multi-link. The link management unit LM1 may associate STA functions for transmitting data for each TID (traffic flow), or may associate one traffic flow with a plurality of STA functions and distribute data to a plurality of STA functions.

(Functional Configuration of Wireless Terminal Apparatus WTA)

Figure 7:
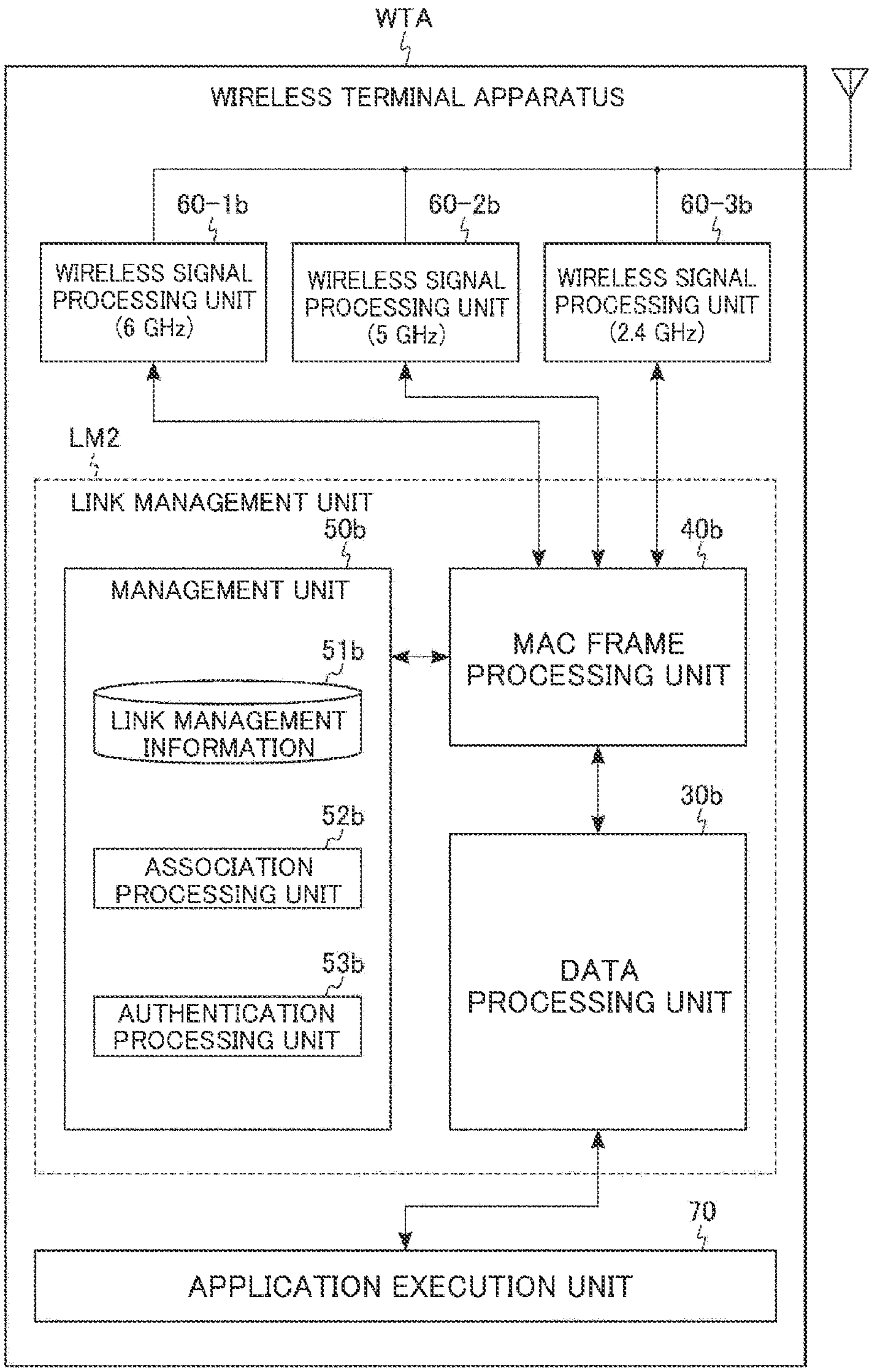
FIG. 7 is a block diagram showing an example of a functional configuration of a wireless terminal apparatus included in the information communication system according to the first embodiment.

FIG. 7 is a block diagram showing an example of the functional configuration of the wireless terminal apparatus WTA included in the information communication system 1 according to the first embodiment. As shown in FIG. 7, the wireless terminal apparatus WTA includes, for example, a data processing unit 30*b*, a MAC frame processing unit 40*b*, a management unit 50*b*, wireless signal processing units 60-1*b*, 60-2*b* and 60-3*b*, and an application execution unit 70. Processing of the data processing unit 30*b*, the MAC frame processing unit 40*b*, the management unit 50*b*, and the wireless signal processing units 60-1*b*, 60-2*b*, and 60-3*b* are implemented by the CPU 20 and the wireless communication module 23, for example. The processing of the application execution unit 70 is implemented by, for example, a CPU 20.

The data processing unit 30*b* can perform LLC layer and upper layer processing on input data. When the wireless terminal apparatus WTA is the transmitting station, the data processing unit 30*b* inputs data input from the application execution unit 70 to the MAC frame processing unit 40*b*. When the wireless terminal apparatus WTA is the receiving station, the data processing unit 30*b* inputs the data input from the MAC frame processing unit 40*b* to the application execution unit 70.

The MAC frame processing unit 40*b* performs part of the MAC layer processing on the input data. When the wireless terminal apparatus WTA is the transmitting station, the MAC frame processing unit 40*b* generates MAC frames from the data input from the data processing unit 30*b*. When the wireless terminal apparatus WTA is the receiving station, the MAC frame processing unit 40*b* reconstructs data from the MAC frames input from each of the wireless signal processing units 60-1*b*, 60-2*b* and 60-3*b*. The MAC frame processing unit 40*b* can also execute processing based on instructions from the management unit 50*b* and exchange information with the management unit 50*b*.

The management unit 50*b* manages the state of the link with the base station AP based on the notifications received from the wireless signal processing units 60-1*b*, 60-2*b* and 60-3*b* via the MAC frame processing unit 40*b*. The management unit 50*b* includes link management information 51*b*, an association processing unit 52*b*, and an authentication processing unit 53*b*. The link management information 51*b* is stored in the RAM 22, for example, and includes information on the base station AP to which the wireless terminal apparatus WTA is wirelessly connected. The association processing unit 52*b* executes a protocol related to association when receiving a connection request from the wireless terminal apparatus WTA via one of the wireless signal processing units 60-1*b*, 60-2*b*, and 60-3*b*. The authentication processing unit 53*b* executes a protocol related to authentication in succession to the connection request.

Each of the wireless signal processing units 60-1*b*, 60-2*b*, and 60-3*b* transmits and receives data between the base station AP and the wireless terminal apparatus WTA by wireless communication. Specifically, each of the wireless signal processing units 60-1*b*, 60-2*b*, and 60-3*b* can execute part of MAC layer processing and first layer processing on input data or wireless signals. More specifically, when the wireless terminal apparatus WTA is the transmitting station, each of the wireless signal processing units 60-1*b*, 60-2*b*, and 60-3*b* adds a preamble, a PHY header, and the like to the data input from the MAC frame processing unit 40*b* to create a wireless frame. Then, each of the wireless signal processing units 60-1*b*, 60-2*b*, and 60-3*b* converts the wireless frame into a wireless signal and distributes the converted wireless signal via the antenna of the wireless terminal apparatus WTA. When the wireless terminal apparatus WTA is the receiving station, each of the wireless signal processing units 60-1*b*, 60-2*b*, and 60-3*b* converts the wireless signal received via the antenna of the wireless terminal apparatus WTA into a wireless frame. Then, each of the wireless signal processing units 60-1*b*, 60-2*b*, and 60-3*b* inputs the data included in the wireless frame to the MAC frame processing unit 40*b*. Note that the wireless signal processing units 60-1*b*, 60-2*b*, and 60-3*b* may or may not share the antenna of the wireless terminal apparatus WTA. In this example, the wireless signal processing units 60-1*b*, 60-2*b* and 60-3*b* handle wireless signals in the 6 GHz band, 5 GHZ band and 2.4 GHz band, respectively. That is, the wireless signal processing units 60-1*b*, 60-2*b* and 60-3*b* correspond to STA1, STA2 and STA3 of the wireless terminal apparatus WTA, respectively.

The application execution unit 70 performs an application which can use the data input from the data processing unit 30*b*. Then, the application execution unit 70 inputs data to the data processing unit 30*b* and acquires data from the data processing unit 30*b* according to the operation of the application. The application execution unit 70 can display application information on the display 24. The application execution unit 70 can execute processing according to an operation through the input interface.

A set of the data processing unit 30*b*, the MAC frame processing unit 40*b*, and the management unit 50*b* provided in the wireless terminal apparatus WTA is hereinafter referred to as a "link management unit LM2." The link management unit LM2 can determine association between traffic and STA functions when establishing multi-links between the base station AP and the wireless terminal apparatus WTA. For example, at the time of multi-link setup, the link management unit LM2 determines the association between traffic and STA functions, and requests the link management unit LM1 of the base station AP to apply the association. Then, when the wireless terminal apparatus WTA receives an acknowledgment of the request from the base station AP, the association between the traffic and the STA function is established.

<1-2> Operation

After describing the outline of the architecture of the MAC layer, operations of the base station AP and the wireless terminal apparatus WTA in the information communication system 1 according to the embodiment will be described below.

<1-2-1> MAC Layer Architecture

Figure 8:
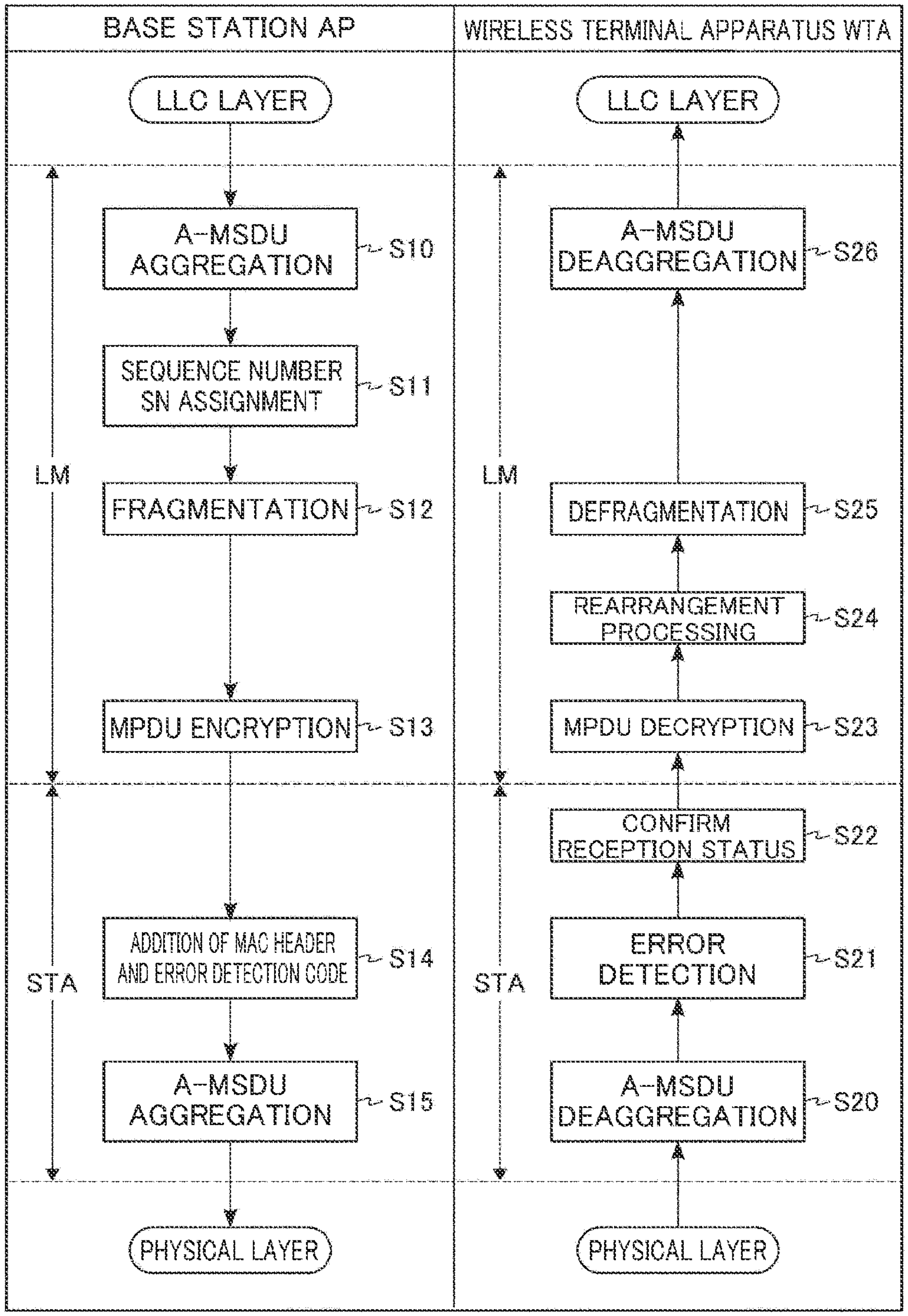
FIG. 8 is a flowchart showing an example of the architecture of a MAC layer in the information communication system according to the first embodiment.

FIG. 8 is a flowchart showing an example of the architecture of the MAC layer in the information communication system 1 according to the first embodiment. The left side of FIG. 8 shows an example of the MAC layer architecture in the base station AP (transmitting station). The right side of FIG. 8 shows an example of the architecture of the MAC layer in the wireless terminal apparatus WTA (receiving station).

(Processing of Base Station AP)

As shown on the left side of FIG. 8, the base station AP sequentially executes the processing of steps S10 to S15 in the MAC layer after the LLC layer processing on the data to be transmitted is completed.

In the processing of step S10, the link management unit LM1 (MAC frame processing unit 40*a*) of the base station AP executes A-MSDU aggregation. A-MSDU aggregation is the processing of combining a plurality of MSDUS (MAC Service Data Units) input from the LLC layer to create one A-MSDU. MSDU is a unit of data handled in the LLC layer. When a plurality of MSDUs have the same receiving station address and the same TID, the MAC frame processing unit 40*a* can create an A-MSDU using the plurality of MSDUS.

In the processing of step S11, the MAC frame processing unit 40*a* assigns one sequence number SN to one A-MSDU. The MAC frame processing unit 40*a* may manage the sequence number SN for each TID, or collectively manage a plurality of TIDs. The sequence number SN is used to identify the portion of data successfully received by the wireless terminal apparatus WTA (receiving station).

In the processing of step S12, the MAC frame processing unit 40*a* executes fragmentation for one A-MSDU. Fragmentation is the processing of fragmenting (dividing) an A-MSDU. Each fragmented A-MSDU corresponds to an MPDU.

In the processing of step S13, the MAC frame processing unit 40*a* performs MPDU encryption on each MPDU. MPDU encryption is the processing of encrypting MPDUS. The encrypted MPDU is configured so that it can be decrypted between the base station AP and the wireless terminal apparatus WTA of which the attribution has been established.

In the processing of step S14, the STA function (wireless signal processing unit 60) of the base station AP adds a MAC header and an error detection code to the encrypted MPDU. The MAC header includes destination and source MAC addresses, an Ethertype field, and so on. Error detection codes are used for error detection of received data at the receiving station. For example, CRC (Cyclic Redundancy Check) is used as the error detection code.

In the processing of step S15, the STA function of the base station AP executes A-MPDU aggregation. A-MPDU aggregation is the processing of generating one A-MPDU by combining a plurality of MPDUs. The generated A-MPDU is input to the physical layer.

As described above, in the information communication system 1 according to the first embodiment, the processing of steps S10 to S13 is executed by the link management unit LM1 of the base station AP (transmitting station), and the processing of steps S14 and S15 is performed by each STA function of the base station AP. The link management unit LM1 of the base station AP may add a header including the sequence number SN to the MPDU to configure the data frame. That is, the processing of step S14 may be executed by the link management unit LM1 of the base station AP.

(Processing of Wireless Terminal Apparatus WTA)

As shown on the right side of FIG. 8, the wireless terminal apparatus WTA (receiving station) executes the processing of steps S20 to S26 in order in the MAC layer after completing the physical layer processing for the received wireless signal.

In the processing of step S20, the STA function (wireless signal processing unit 60) of the wireless terminal apparatus WTA executes A-MPDU deaggregation. A-MPDU deaggregation is the processing of deaggregating (dividing) A-MPDUs input from the physical layer into MPDU units.

In the processing of step S21, the STA function of the wireless terminal apparatus WTA executes error detection. Error detection is the processing of detecting errors in received data using an error detection code (for example, CRC). Error detection in step S21 is performed for each MPDU.

In the processing of step S22, the STA function of the wireless terminal apparatus WTA confirms the reception status. Specifically, the STA function of the wireless terminal apparatus WTA determines whether the data (MPDU) has been successfully received based on the success or failure of error detection. When no error is detected, that is, when the data reception is successful, the STA function of the wireless terminal apparatus WTA executes the following processing using the data. On the other hand, when an error is detected, the STA function of the wireless terminal apparatus WTA discards the data in which the error was detected.

In the processing of step S23, the link management unit LM2 (MAC frame processing unit 40*b*) of the wireless terminal apparatus WTA executes MPDU decryption. MPDU decryption is the processing of decrypting an encrypted MPDU. Decryption of the MPDU is successful if it is data communicated between a base station AP and a wireless terminal apparatus WTA of which the attribution has been established.

In the processing of step S24, the MAC frame processing unit 40*b* rearranges the decrypted MPDUS. The rearrangement processing is the processing of rearranging successfully received MPDUs in order of sequence number SN.

In the processing of step S25, the MAC frame processing unit 40*b* defragments the rearranged MPDUS. Defragmentation is the processing of reconstructing an A-MSDU by combining a plurality of MPDUS.

In the processing of step S26, the MAC frame processing unit 40*b* performs A-MSDU deaggregation. A-MSDU deaggregation is the processing of dividing reconstructed A-MSDU into MSDU units. The divided A-MSDUs are input to the LLC layer.

As described above, in the information communication system 1 according to the first embodiment, the processing of steps S20 to S22 is executed by each STA function of the wireless terminal apparatus WTA (receiving station), and the processing of steps S23 to S26 is executed by the link management unit LM2 of the wireless terminal apparatus WTA.

<1-2-2> Transmission Operation of Base Station AP (Transmitting Station)

Figure 9:
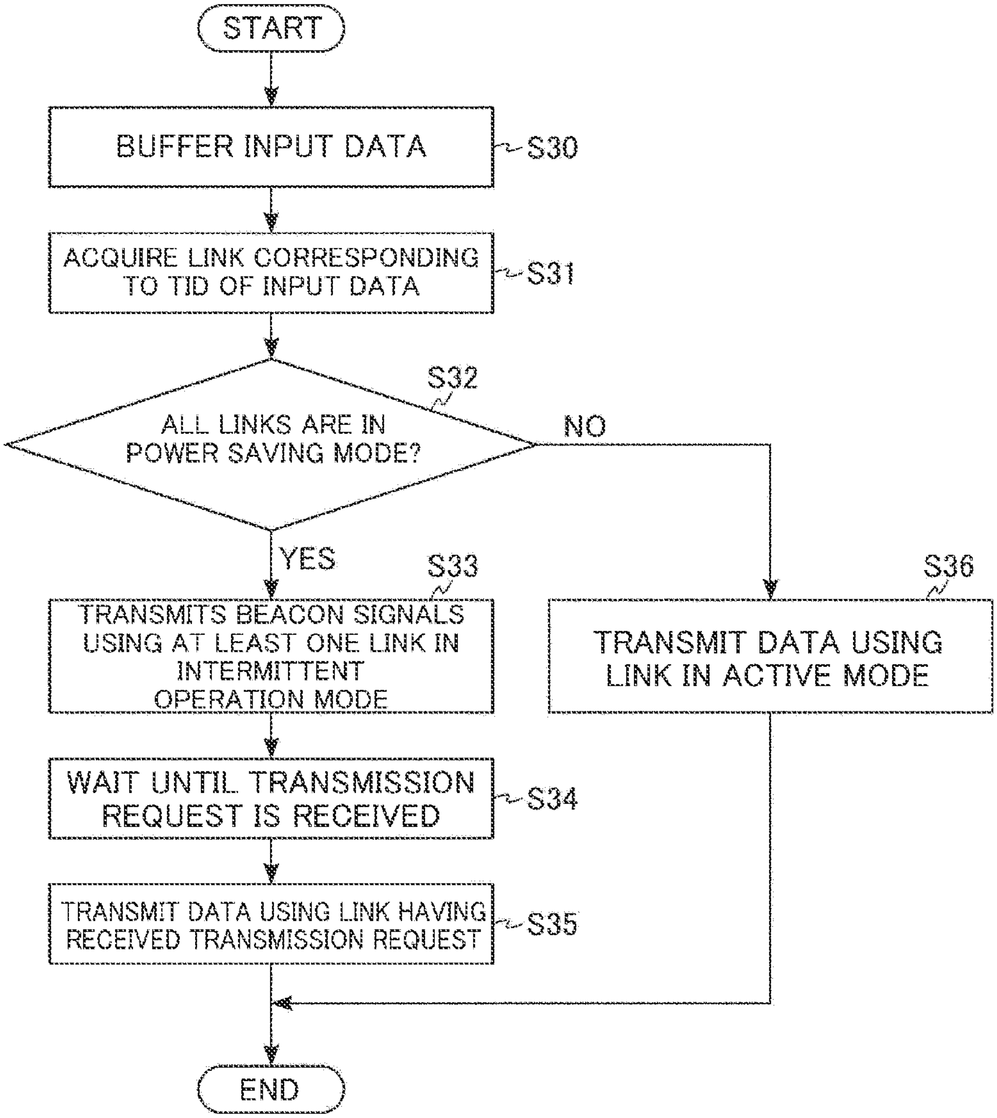
FIG. 9 is a flowchart showing an example of a transmission operation of a base station included in the information communication system according to the first embodiment.

FIG. 9 is a flowchart showing an example of the transmission operation of the base station AP (transmitting station) included in the information communication system 1 according to the first embodiment. The transmission operation of the base station AP will be described below with reference to FIG. 9.

When the data processed by the data processing unit 30*a* is input to the MAC frame processing unit 40*a*, the base station AP starts the series of steps of processing in FIG. 9 (Start).

First, the link management unit LM1 of the base station AP buffers the input data (step S30). In other words, when data is input from the LLC layer, the MAC frame processing unit 40*a* of the link management unit LM1 accumulates the data in the buffer memory.

Next, the link management unit LM1 of the base station AP acquires the link corresponding to the TID of the input data (step S31). Specifically, the management unit 50*a* of the link management unit LM1 refers to the "TID" of the link management information 51*a* corresponding to the AID of the transmission destination (destination) of the input data, and acquires the link associated with the TID of the input data, for example, by mapping.

Next, the link management unit LM1 of the base station AP confirms whether all links are operating in the power saving mode (step S32). Specifically, the management unit 50*a* refers to the "status" of the link management information 51*a* corresponding to the AID of the transmission destination of the input data, and confirms the status of at least one link (STA function) associated with the TID of the input data. Then, it is confirmed whether the statuses of the at least one link are all in the active mode or power saving mode. This "power saving mode" corresponds to multi-link power saving configured by links which do not include links in the active mode and are in the intermittent operation mode or sleep mode.

In the processing of step S32, if it is confirmed that all links are in the power saving mode (step S32, YES), that is, all STA functions constituting multi-links with the destination wireless terminal apparatus WTA are in the intermittent operation mode or sleep mode, the link management unit LM1 of the base station AP transmits a beacon signal using at least one link in the intermittent operation mode (step S33). One or more of the "at least one link in the intermittent operation mode" can be appropriately selected by the link management unit LM1. The beacon signal includes information for notifying whether there is data buffered by the base station AP for each AID.

After the processing of step S33, the link management unit LM1 of the base station AP waits until it receives a transmission request (step S34). At this time, the wireless terminal apparatus WTA receives the beacon signal transmitted by the processing of step S33, and in response to the beacon signal, transmits a transmission request (a polling for the wireless terminal apparatus WTA to acquire data from the base station AP). Note that the link management unit LM1 of the base station AP may cause the same STA function to retransmit the beacon signal when no transmission request is received for a predetermined time after transmitting the beacon signal.

Upon receiving the transmission request, the link management unit LM1 of the base station AP transmits data using the link having received the transmission request (step S35). In other words, when receiving a transmission request, the link management unit LM1 outputs the data buffered in the buffer memory to the STA function corresponding to the link having received the transmission request. As a result, data is transmitted from the base station AP to the wireless terminal apparatus WTA. When the processing of step S35 is completed, the base station AP ends the series of steps of processing in FIG. 9 (End).

In the processing of step S32, if it is confirmed that all the links are not in the power saving mode (step S32, YES), that is, if a plurality of STA functions constituting a multi-link with the destination wireless terminal apparatus WTA includes a STA function in the active mode, the link management unit LM1 of the base station AP transmits data using the link in the active mode (step S36). In other words, when some of the plurality of STA functions that constitute the multi-link are in the active mode, data is transmitted to the destination wireless terminal apparatus WTA using the link in the active mode. When the processing of step S36 is completed, the base station AP ends the series of steps of processing in FIG. 9 (End).

Note that when a plurality of wireless terminal apparatuses WTA is wirelessly connected to the base station AP, the link management unit LM1 of the base station AP may receive transmission requests from a plurality of links. Even in such a case, the link management unit LM1 can manage the link (STA function) used for data transmission for each AID by referring to the link management information 51*a*. When the traffic type of the data input to the base station AP is "LL (Low latency)," the link management unit LM1 preferably maps the data to a link that is not in the power saving mode.

(Format of Beacon Signal)

Figure 10:
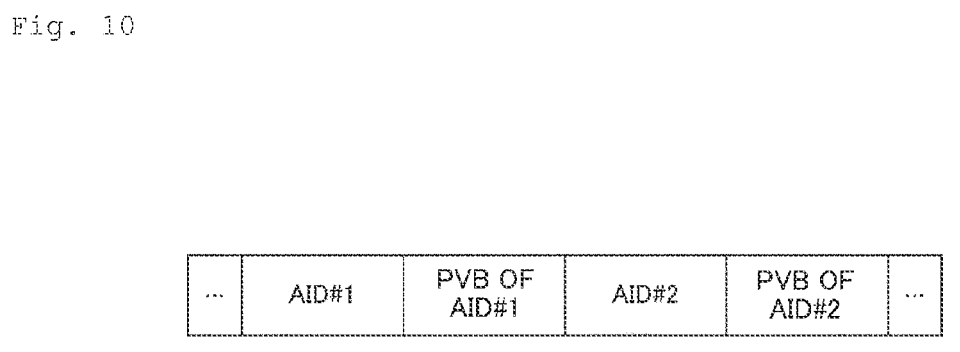

FIG. 10 is a conceptual diagram showing an example of the format of a beacon signal used during a multi-link power saving mode in the information communication system 1 according to the first embodiment. As shown in FIG. 10, the beacon signal includes AIDs of wireless terminal apparatuses WTA wirelessly connected to the base station AP, and PVBs (Partial Virtual Bitmaps) for each AID. The presence or absence of buffer data for the associated AID is stored in the PVB. For example, in the beacon signal, pairs of AID and PVB are stored in order, such as "AID #1," "PVB of AID #1," "AID #2," and "PVB of AID #2." Note that the beacon signal may be in other formats as long as the pair of AID and PVB can be grasped by the wireless terminal apparatus WTA.

<1-2-3> Reception Operation of Wireless Terminal Apparatus WTA (Receiving Station)

Figure 11:
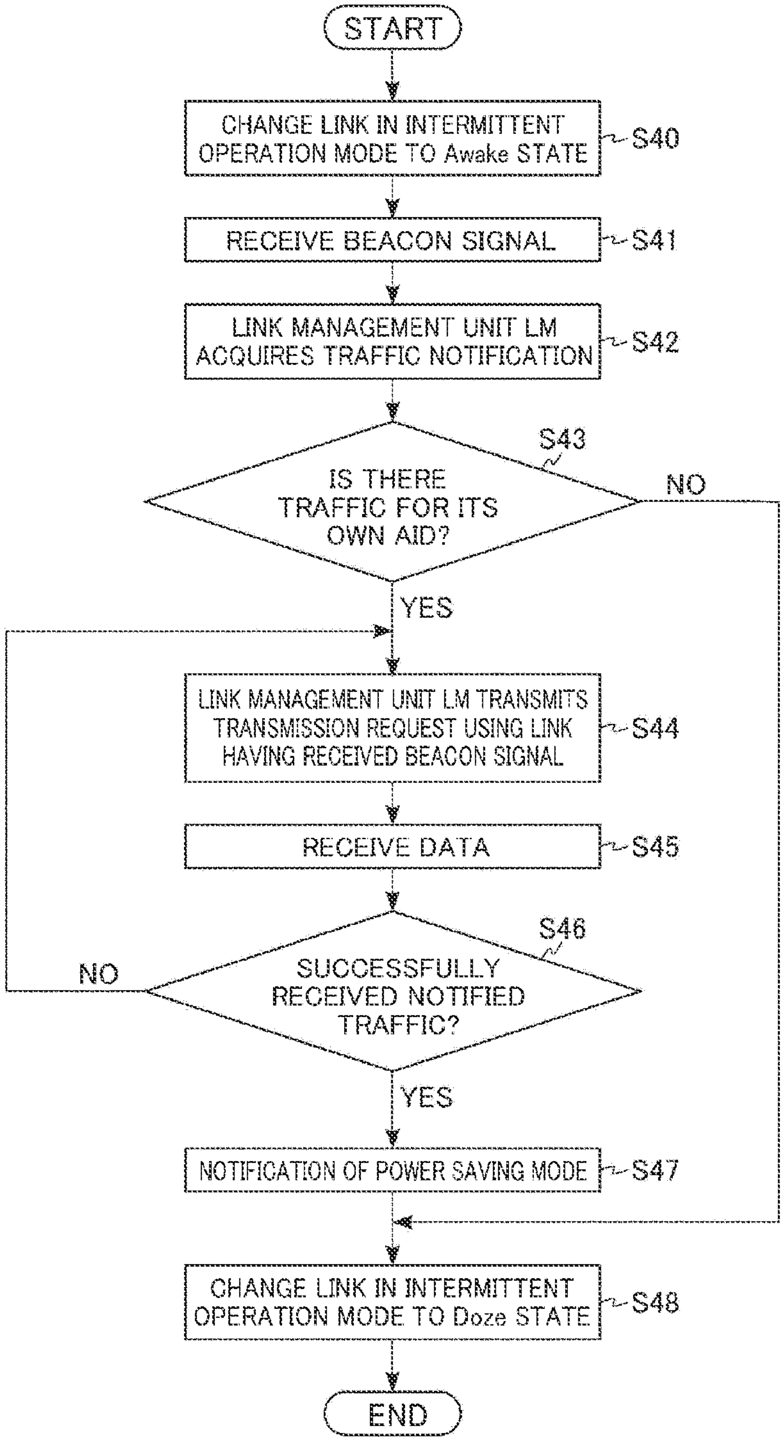
FIG. 11 is a flowchart showing an example of a reception operation of the wireless terminal apparatus included in the information communication system according to the first embodiment.

FIG. 11 is a flowchart showing an example of the reception operation of the wireless terminal apparatus WTA (receiving station) included in the information communication system 1 according to the first embodiment. The reception operation of the wireless terminal apparatus WTA will be described below with reference to FIG. 11.

The wireless terminal apparatus WTA sets at least one link in the intermittent operation mode during a multi-link power saving mode, and when a period in which the link in the intermittent operation mode is in the Doze state exceeds a predetermined time, the series of processing in FIG. 11 is started (Start).

First, the link management unit LM2 of the wireless terminal apparatus WTA changes the link in the intermittent operation mode to the Awake state (step S40). The timing for changing the link in the intermittent operation mode to the Awake state is set based on the timing at which the base station AP transmits the beacon signal.

After that, the link (STA function) changed to the Awake state receives the beacon signal (step S41). The link then transmits the information included in the received beacon signal to the link management unit LM2 of the wireless terminal apparatus WTA.

Next, the link management unit LM2 of the wireless terminal apparatus WTA acquires the traffic notification (step S42). The traffic notification corresponds to information including the AID and PVB pairs included in the beacon signal described with reference to FIG. 10.

Next, the link management unit LM2 of the wireless terminal apparatus WTA confirms whether there is traffic for its own AID (step S43). In other words, the link management unit LM2 confirms, from the received beacon signal, whether data addressed to the subject station is buffered in the base station AP.

In the processing of step S43, when it is confirmed that there is no traffic for its own AID (step S43, NO), the wireless terminal apparatus WTA proceeds to the processing of step S48.

In the processing of step S43, when it is confirmed that there is traffic for its own AID (step S43, YES), the link management unit LM2 of the wireless terminal apparatus WTA uses the link having received the beacon signal to transmit a transmission request (step S44). In other words, the link management unit LM2 outputs a polling for requesting data transmission to the link having received the beacon signal. Note that when beacon signals are received on a plurality of links, the link management unit LM2 may transmit a transmission request using the link with the highest received power.

After step S44, the wireless signal processing unit 60*b* corresponding to the link having transmitted the transmission request receives the data (step S45).

After the processing of step S45, the link management unit LM2 of the wireless terminal apparatus WTA confirms whether the notified traffic has been successfully received (step S46). That is, the link management unit LM2 confirms whether the error correction (step S21 in FIG. 8) of the data received in step S45 was successful.

In the processing of step S46, when it is confirmed that the notified traffic has not been successfully received (step S46, NO), the wireless terminal apparatus WTA proceeds to the processing of step S44. That is, the wireless terminal apparatus WTA repeatedly executes the processing of steps S44 to S46 until it can correctly receive the notified traffic.

In the processing of step S46, if it is confirmed that the notified traffic has been successfully received (step S46, YES), the wireless terminal apparatus WTA uses the link used for traffic reception, for example, to notify the base station AP that the multi-link will transition to the power saving mode (step S47). After the processing of step S47 is completed, the wireless terminal apparatus WTA proceeds to the processing of step S48.

In the processing of step S48, the link management unit LM2 of the wireless terminal apparatus WTA changes the link in the intermittent operation mode to the Doze state. When the processing of step S48 is completed, the wireless terminal apparatus WTA ends the series of processing in FIG. 11 (End).

As described above, the STA function of the wireless terminal apparatus WTA periodically enters the Awake state in order to receive the beacon signal from the base station AP, and outputs the received beacon signal to the link management unit LM2. Based on the received beacon signal, the link management unit LM2 appropriately transmits a data transmission request to the base station AP. After the data transmission is completed, the link management unit LM2 transitions the link used for data transmission to the Doze state.

<1-2-4> Specific Example of Transmission/Reception Operation

Figure 12:
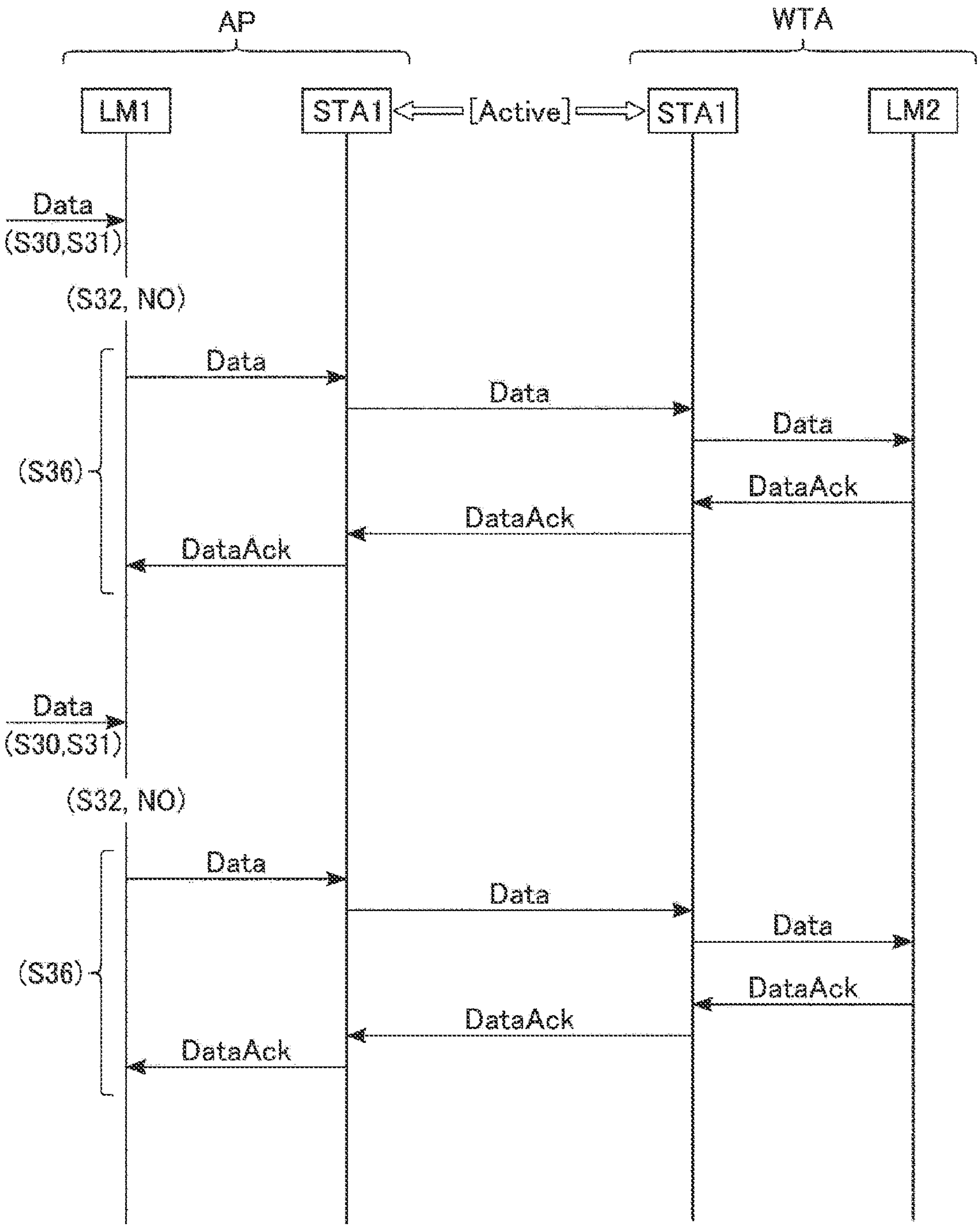
FIG. 12 is a sequence diagram showing a specific example of a traffic transmission/reception method in a normal operation mode of the information communication system according to the first embodiment.

Specific Example of Traffic Transmission/Reception Method in Normal Operation Mode FIG. 12 is a sequence diagram showing a specific example of a traffic transmission/reception method in the normal operation mode of the information communication system 1 according to the first embodiment. In this example, STA1 and STA2 of the base station AP and the wireless terminal apparatus WTA respectively establish multi-links, and STA1 in the active mode (Active) is illustrated. A specific example of a traffic transmission/reception method in the normal operation mode will be described below with reference to FIG. 12.

When data (Data) is input to the link management unit LM1 of the base station AP, the link management unit LM1 executes the processing of steps S30 to S32. That is, the input data is buffered (step S30), and the link corresponding to the TID of the input data is acquired (step S31). In this example, since STA1 of each of the base station AP and the wireless terminal apparatus WTA is in the active mode (step S32, NO), data is subsequently transmitted using the link in the active mode (step S36).

Specifically, the link management unit LM1 uses STA1 of the base station AP to transmit data to STA1 of the wireless terminal apparatus WTA. When STA1 of the wireless terminal apparatus WTA receives the data, it transmits the received data to the link management unit LM2 of the wireless terminal apparatus WTA. Then, the link management unit LM2 transmits a reception response (DataAck) to STA1 of the base station AP using STA1 of the wireless terminal apparatus WTA in response to correctly receiving the data. STA1 of the base station AP transmits the reception response received from STA1 of the wireless terminal apparatus WTA to the link management unit LM1. Upon receiving the reception response, the link management unit LM1 recognizes that the data has been successfully transmitted, and discards the data having been transmitted from the buffer memory.

Figure 13:
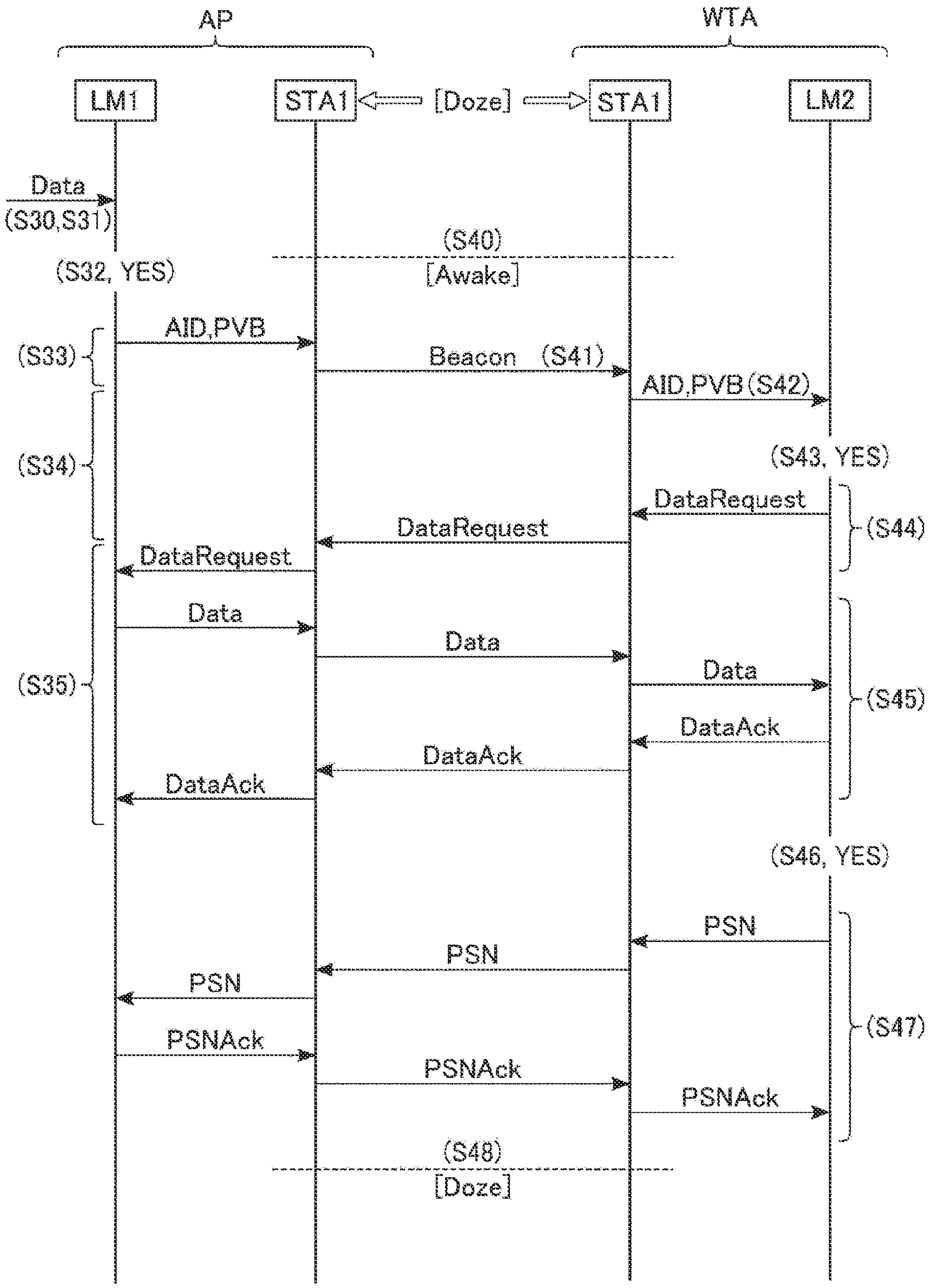
FIG. 13 is a sequence diagram showing a specific example of a traffic transmission/reception method during a multi-link power saving mode in the information communication system according to the first embodiment.

Specific Example of Traffic Transmission/Reception Method During Multi-Link Power Saving Mode FIG. 13 is a sequence diagram showing a specific example of a traffic transmission/reception method during a multi-link power saving mode in the information communication system 1 according to the first embodiment. In this example, STA1 and STA2 of the base station AP and the wireless terminal apparatus WTA, respectively, have established multi-links, and STA1 is in the Doze state in the intermittent operation mode. A specific example of a traffic transmission/reception method during a multi-link power saving mode will be described below with reference to FIG. 13.

When data (Data) is input to the link management unit LM1 of the base station AP, the link management unit LM1 executes the processing of steps S30 to S32. That is, the input data is buffered (step S30), and the link corresponding to the TID of the input data is acquired (step S31). In this example, since STA1 of each of the base station AP and the wireless terminal apparatus WTA is in the power saving mode (intermittent operation mode) (step S32, YES), a beacon signal (Beacon) is subsequently transmitted (step S33).

Specifically, before the beacon signal is transmitted, the STA1 of each of the base station AP and the wireless terminal apparatus WTA is changed from the Doze state to the Awake state (step S40). Then, the link management unit LM1 uses STA1 of the base station AP to transmit a beacon signal including AID and PVB information corresponding to traffic to STA1 of the wireless terminal apparatus WTA (step S33). When STA1 of the wireless terminal apparatus WTA receives the beacon signal, it transmits the AID and PVB information included in the beacon signal to the link management unit LM2 of the wireless terminal apparatus WTA. Then, based on the transmitted AID and PVB information, the link management unit LM2 confirms that there is traffic for its own AID (step S43, YES), and transmits a data transmission request (Data Request) to the base station AP via the link (STA1) having received the beacon signal (step S44). Upon receiving the transmission request via STA1 of the base station AP, the link management unit LM1 of the base station AP transmits data to the wireless terminal apparatus WTA using STA1 of the base station AP (step S35). Then, the wireless terminal apparatus WTA receives the data and transmits a reception response to the base station AP as in the normal operation mode (step S45).

After that, the link management unit LM2 of the base station AP notifies the wireless terminal apparatus WTA of the start of the power saving mode in response to completion of reception of the notified traffic (step S47). Specifically, the link management unit LM2 uses the link (STA1) used for data reception to transmit a power saving mode notification signal (PSN) to STA1 of the wireless terminal apparatus WTA. Upon receiving the notification signal, STA1 of the base station AP transmits the received notification signal to the link management unit LM1. Then, the link management unit LM1 updates the link management information based on the notification signal, and uses STA1 of the base station AP to transmit a power saving mode acknowledgment (PSNAck) to STA1 of the wireless terminal apparatus WTA. Upon receiving the acknowledgment, STA1 of the wireless terminal apparatus WTA transmits the received acknowledgment to the link management unit LM2. The link management unit LM2 then updates the link management information based on the acknowledgment signal. Then, STA1 of each of the base station AP and the wireless terminal apparatus WTA transitions to the power saving mode (Doze state) (step S48).

<1-3> Effects of First Embodiment

Multi-link data communication can realize efficient communication and improve communication speed by using a plurality of bands. On the other hand, the power consumption of multi-link is higher than that of a single link because a plurality of STA functions is used in each of the base station and the wireless terminal apparatus. For this reason, when traffic is not stagnant, it is preferable for each link constituting the multi-link to operate in the power saving mode.

As for the operation of the base station when data addressed to the wireless terminal apparatus in the power saving mode is input, it is conceivable to notify the wireless terminal apparatus of the presence or absence of buffer data by transmitting a beacon signal indicating that there is buffer data. However, when notifying a plurality of wireless terminal apparatuses WTA of the presence or absence of buffer data in AID units, each wireless terminal apparatus does not know which link will transition to the Awake state.

Therefore, in the information communication system 1 according to the first embodiment, when all links corresponding to TIDs of traffic input from the LLC layer are in the power saving mode (intermittent operation mode or sleep mode), the base station AP transmits a beacon signal notifying the presence of the traffic to each link corresponding to the TID while buffering the traffic. As a result, the association between the TID buffering the traffic and the link (STA function) is identified by the link transmitting the beacon signal instead of the buffer information for each TID.

As a result, based on the link having received the beacon signal and the information (AID and PVB) included in the beacon signal, the wireless terminal apparatus WTA can determine whether there is traffic addressed to the subject station and the link assigned to the traffic addressed to the subject station. Then, the wireless terminal apparatus WTA can transmit a transmission request to the base station AP and receive data using one of the links based on the association between the TID and the link set in the multi-link.

As described above, the information communication system 1 according to the first embodiment can more reliably transmit data buffered in the base station AP to the wireless terminal apparatus WTA even when each link constituting the multi-link is in the power saving mode. Further, the information communication system 1 according to the first embodiment can more positively utilize the power saving mode by improving the reliability of data transmission during the power saving mode. As a result, the information communication system 1 according to the first embodiment can reduce power consumption.

<2> Second Embodiment

The configuration of the information communication system 1 according to the second embodiment is the same as that of the first embodiment. In the information communication system 1 according to the second embodiment, the wireless terminal apparatus WTA transmits a transmission request without via the link management unit LM2 during a multi-link power saving mode. The information communication system 1 according to the second embodiment will be described below with respect to the differences from the first embodiment.

<2-1> Operation

<2-1-1> Reception Operation of Wireless Terminal Apparatus WTA (Receiving Station)

Figure 14:
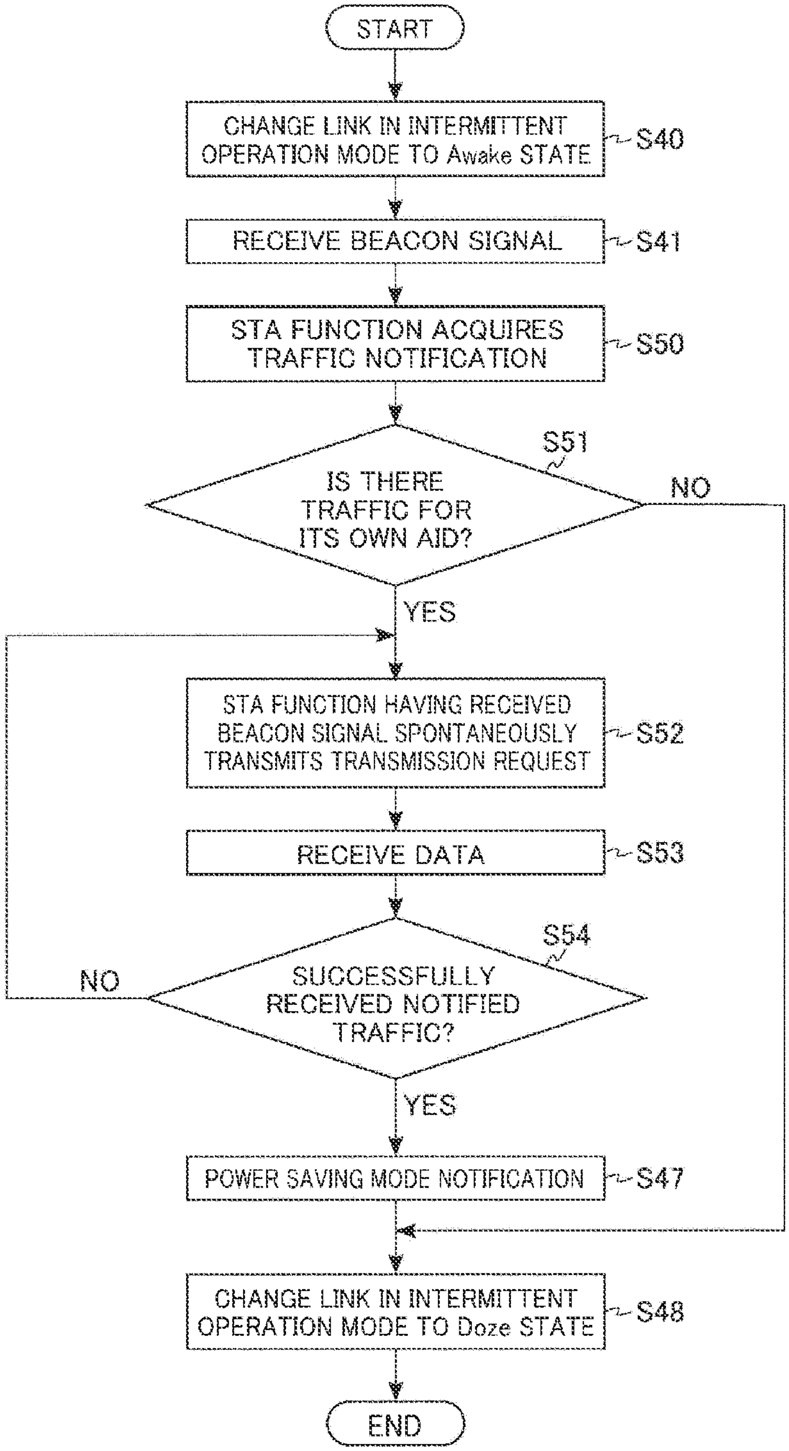
FIG. 14 is a flowchart showing an example of a reception operation of a wireless terminal apparatus included in an information communication system according to a second embodiment.

FIG. 14 is a flowchart showing an example of the reception operation of the wireless terminal apparatus WTA (receiving station) included in the information communication system 1 according to the second embodiment. As shown in FIG. 14, the reception operation of the wireless terminal apparatus WTA according to the second embodiment is the same as the reception operation of the wireless terminal apparatus WTA according to the first embodiment described with reference to FIG. 11 except that the processing of steps S42 to S46 is replaced with the processing of steps S50 to S54.

Specifically, first, as in the first embodiment, the reception operation is started (Start), the link in the intermittent operation mode is changed to the Awake state (step S40), and the link receives the beacon signal (step S41).

After the processing of step S41, the STA function of the wireless terminal apparatus WTA acquires a traffic notification (step S50).

Next, the STA function of the wireless terminal apparatus WTA confirms whether the traffic is for its own AID (step S51). That is, in the second embodiment, the STA function of the wireless terminal apparatus WTA recognizes the AID to which it belongs. Then, the STA function of the wireless terminal apparatus WTA confirms whether data addressed to the subject station is buffered in the base station AP based on the traffic notification (AID and PVB) included in the received beacon signal.

In the processing of step S51, when it is confirmed that the traffic is not for its own AID (step S51, NO), the wireless terminal apparatus WTA proceeds to the processing of step S48.

In the processing of step S51, when it is confirmed that the traffic is for its own AID (step S51, YES), the STA function that has received the beacon signal spontaneously transmits a transmission request (step S52). In other words, the link having received the beacon signal transmits a polling for requesting data transmission to the base station AP without via an instruction from the link management unit LM2.

After step S52, the link having transmitted the transmission request receives the data (step S53).

After the processing of step S53, the link management unit LM2 of the wireless terminal apparatus WTA confirms whether the notified traffic has been successfully received (step S54). That is, it is confirmed whether the STA function of the wireless terminal apparatus WTA succeeded in error correction of the data received in step S45.

In the processing of step S54, when it is confirmed that the notified traffic has not been successfully received (step S54, NO), the wireless terminal apparatus WTA proceeds to the processing of step S52. That is, the wireless terminal apparatus WTA repeatedly executes the processing of steps S52 to S54 until it can correctly receive the notified traffic.

In the processing of step S54, when it is confirmed that the notified traffic has been successfully received (step S54, YES), the STA function of the wireless terminal apparatus WTA transmits the data to the link management unit LM2. Then, the link management unit LM2 notifies the base station AP that the multi-link will transition to the power saving mode, as in the first embodiment (step S47). After completing the processing of step S54, the wireless terminal apparatus WTA proceeds to the processing of step S48.

In the processing of step S48, the link management unit LM2 of the wireless terminal apparatus WTA changes the link in the intermittent operation mode to the Doze state, as in the first embodiment. When the processing of step S48 is completed, the wireless terminal apparatus WTA ends the series of processing in FIG. 14 (End). Other operations of the information communication system 1 according to the second embodiment are the same as those of the first embodiment.

<2-1-2> Specific Example of Transmission/Reception Operation

Figure 15:
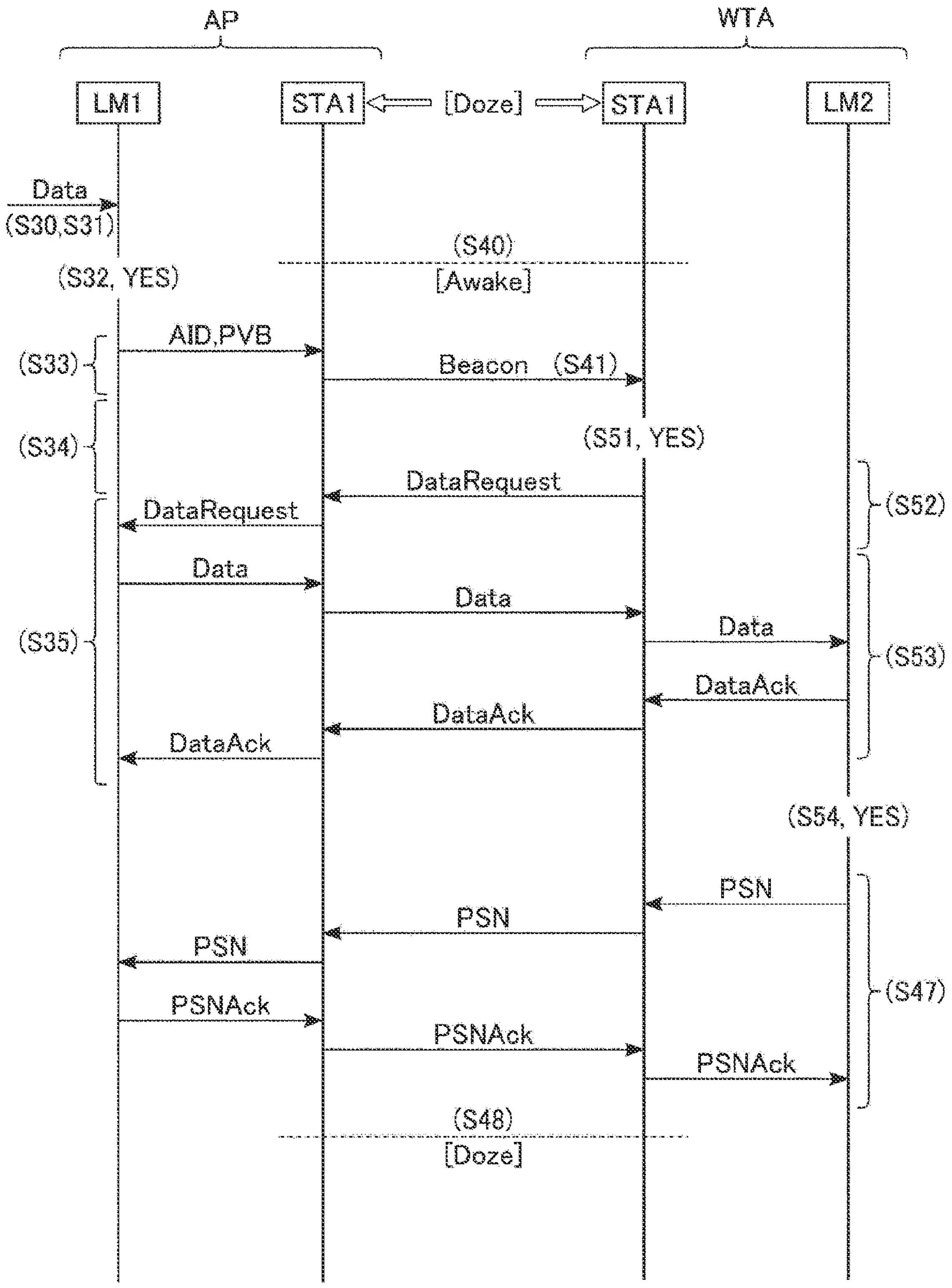
FIG. 15 is a sequence diagram showing a specific example of a traffic transmission/reception method using a link in a power saving state in the information communication system according to the second embodiment.

FIG. 15 is a sequence diagram showing a specific example of a traffic transmission/reception method using a link in a power saving state in the information communication system 1 according to the second embodiment. In this example, STA1 and STA2 of the base station AP and the wireless terminal apparatus WTA, respectively, have established multi-links, and STA1 in the Doze state in the intermittent operation mode is illustrated. As shown in FIG. 15, the operation of the information communication system 1 according to the second embodiment is the same as the operation of the information communication system 1 according to the first embodiment described with reference to FIG. 13, except for the operation of the wireless terminal apparatus WTA.

Specifically, when a beacon signal is transmitted based on the input of data to the base station AP and the STA1 of each of the base station AP and the wireless terminal apparatus WTA being in the intermittent operation mode (step S33), as in the first embodiment, STA1 of the wireless terminal apparatus WTA receives the beacon signal (step S41). Then, STA1 of the wireless terminal apparatus WTA refers to the AID and PVB information included in the beacon signal to confirm that there is traffic for its own AID (step S51, YES), and transmits a data transmission request to STA1 of the base station AP (step S52). Upon receiving a transmission request via STA1 of the base station AP, the link management unit LM1 of the base station AP transmits data to STA1 of the wireless terminal apparatus WTA using STA1 of the base station AP, as in the first embodiment (step S35). Then, the wireless terminal apparatus WTA receives data and transmits a reception response to the base station AP, as in the normal operation mode. Note that the reception response by the wireless terminal apparatus WTA may be transmitted by the STA function without via the link management unit LM2. The operation related to notification of the power saving mode after successful reception of data shown in FIG. 15 is the same as the operation shown in FIG. 13.

<2-2> Effects of Second Embodiment

As described above, in the information communication system 1 according to the second embodiment, the STA function in the power saving mode of the wireless terminal apparatus WTA periodically enters the Awake state in order to receive the beacon signal. Then, the STA function of the wireless terminal apparatus WTA confirms that traffic addressed to the subject station is accumulated, and transmits a transmission request to the base station AP without via the link management unit LM2. As a result, the information communication system 1 according to the second embodiment can obtain the same effects as those of the first embodiment, and can make the response of the wireless terminal apparatus WTA during the power saving mode quicker than that of the first embodiment. In addition, since the wireless terminal apparatus WTA according to the second embodiment omits part of the processing of the reception operation, power consumption can be suppressed more than in the first embodiment.

<3> Third Embodiment

The configuration of the information communication system 1 according to the third embodiment is the same as that of the first embodiment. In the information communication system 1 according to the third embodiment, the wireless terminal apparatus WTA executes processing according to the traffic type during a multi-link power saving mode. The information communication system 1 according to the third embodiment will be described below with respect to the differences from the first embodiment.

<3-1> Operation of Base Station AP (Transmitting Station)

Figure 16:
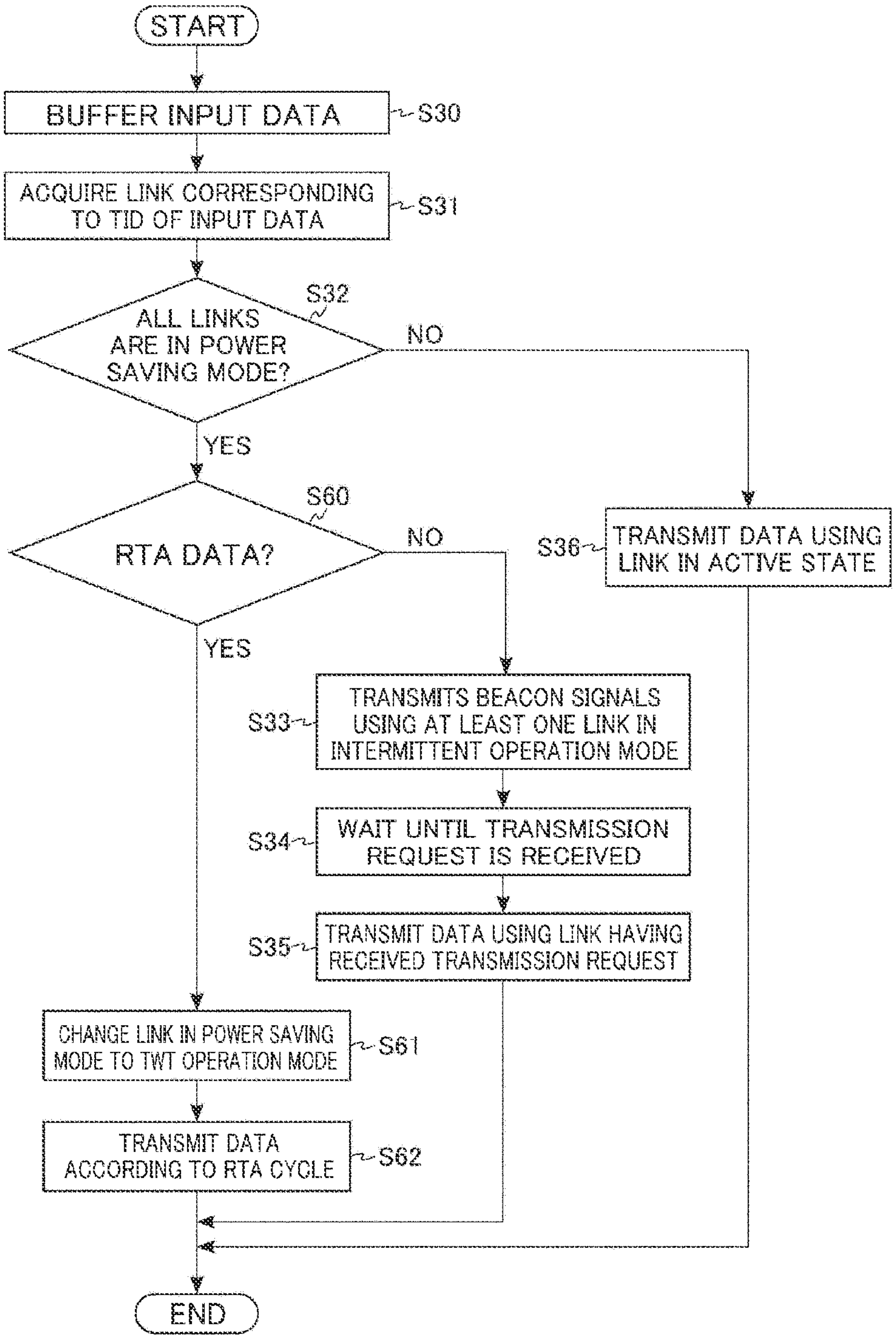
FIG. 16 is a flowchart showing an example of a transmission operation of a base station included in an information communication system according to a third embodiment.

FIG. 16 is a flowchart showing an example of the transmission operation of the base station AP (transmitting station) included in the information communication system 1 according to the third embodiment. As shown in FIG. 16, the reception operation of the wireless terminal apparatus WTA according to the third embodiment is the same as the transmission operation of the base station AP according to the first embodiment described with reference to FIG. 9 except that the processing when the determination condition in the processing of step S32 is satisfied is changed.

Specifically, first, as in the first embodiment, the transmission operation is started (started), the input data is buffered (step S30), the link corresponding to the TID of the input data is acquired (step S31), and it is confirmed whether all links are in the power saving mode (step S32).

In the processing of step S32, when it is confirmed that all the links are not in the power saving mode (step S32, NO), data is transmitted using the links in the active state (step S36) as in the first embodiment, and the series of steps of processing in FIG. 16 ends (End).

In the processing of step S32, when it is confirmed that all the links are in the power saving mode (step S32, YES), the link management unit LM1 of the base station AP confirms whether the input data is RTA (Real Time Applications) data (step S60). RTA data is data that requires low latency. For example, “LL” is assigned as a traffic type to RTA data.

In the processing of step S60, when it is confirmed that the input data is not RTA data (step S60, NO), as in the first embodiment, at least one link in the intermittent operation mode is used to transmit the beacon signal (step S33), the link waits until the transmission request is received (step S34), data is transmitted using the link having received the transmission request (step S35), and the series of steps of processing in FIG. 16 ends (End).

In the processing of step S60, if it is confirmed that the input data is RTA data (step S60, YES), the link management unit LM1 of the base station AP changes the link in the power saving mode to a TWT (Target Wake Time) operation mode (step S61). The TWT operation mode is an operation mode in which the link is set to the Awake state or the Doze state based on the startup timing scheduled by synchronizing the base station AP and the wireless terminal apparatus WTA.

After the processing of step S61, the link management unit LM1 of the base station AP transmits data according to the RTA cycle (step S62). Specifically, for example, the link management unit LM1 notifies the link management unit LM2 of the wireless terminal apparatus WTA of the RTA cycle, and the link management unit LM2 sets the link (STA function) in the power saving mode to the Awake state in accordance with the RTA cycle. In this way, the base station AP can transmit data to the wireless terminal apparatus WTA in accordance with the RTA cycle. When the processing of step S62 is completed, the base station AP ends the series of steps of processing in FIG. 16 (End). Other operations of the information communication system 1 according to the third embodiment are the same as those of the first embodiment.

<3-2> Effects of Third Embodiment

As described above, the multi-link power saving state may be switched according to the type of traffic input to the base station AP. For example, in the information communication system 1 according to the third embodiment, in response to input of RTA traffic, the base station AP changes the link in the multi-link power saving mode to the TWT operation mode in accordance with the RTA cycle. As a result, the information communication system 1 according to the third embodiment can transmit RTA traffic within the requested latency range.

<4> Others

In the above-described embodiment, each STA function may notify the corresponding link management unit LM when the link cannot be maintained due to movement of the wireless terminal apparatus WTA or the like. The link management unit LM2 of the wireless terminal apparatus WTA may change the state of the multi-link with the link management unit LM1 of the base station AP based on the notification from the STA function. Specifically, for example, the link management unit LM2 of the wireless terminal apparatus WTA and the link management unit LM1 of the base station AP may appropriately change the STA functions used in multi-link. When the multi-link state is changed, the link management units LM1 and LM2 update the pieces of link management information 51*a* and 51*b*, respectively. Furthermore, the link management units LM1 and LM2 may update the association between traffic and the STA function according to an increase or decrease in the number of links.

The configuration and functional configuration of the information communication system 1 according to the embodiment may be other configurations. For example, the case where each of the base station AP and the wireless terminal apparatus WTA has three STA functions (wireless signal processing units) has been illustrated, but the present invention is not limited to this. The base station AP only needs to have at least two wireless signal processing units. Similarly, the wireless terminal apparatus WTA only needs to have at least two wireless signal processing units. In addition, the number of channels that can be processed by each STA function can be set appropriately according to the frequency band to be used. Each of the wireless communication modules 13 and 23 may correspond to wireless communication in a plurality of frequency bands by a plurality of communication modules, or may correspond to wireless communication in a plurality of frequency bands by one communication module. The functional configurations of the base station AP and the wireless terminal apparatus WTA may be given other names and grouped as long as they can execute the operations described in the embodiments.

In the information communication system 1 according to the embodiment, each of the CPU 10 provided in the base station AP and the CPU 20 provided in the wireless terminal apparatus WTA may be other circuits. For example, each of the base station AP and the wireless terminal apparatus WTA may include an MPU (Micro Processing Unit) or the like instead of the CPU. Each of the steps of processing described in the embodiments may be implemented by dedicated hardware. The processing of each of the base station AP and the wireless terminal apparatus WTA may be a combination of processing executed by software and processing executed by hardware, or may be one or the other.

In the embodiments, the case where the wireless terminal apparatus WTA operates as a receiving station is exemplified, but the wireless terminal apparatus WTA may operate as the access point (base station AP) described in each embodiment. In the embodiment, the flowchart used for explaining the operation is merely an example. Each operation described in the embodiments may be replaced within a range in which the order of the processing can be fulfilled, or other processing may be added. The wireless frame format described in the embodiment is merely an example. Other formats may be used in the information communication system 1 as long as the operations described in the embodiments can be performed.

Note that the present invention is not limited to the embodiments described above and can variously be modified at an execution stage within a scope not departing from the gist of the present invention. In addition, each of the embodiments may be combined appropriately, and in such a case, advantageous effects of the combinations can be obtained. Further, the foregoing embodiments include various inventions, and various inventions can be extracted by selecting combinations of the plurality of constituent elements disclosed herein. For example, even if several constituent elements are removed from all the constituent elements described in the embodiments, configurations in which those constituent elements are removed can be extracted as an invention as long as the problem can be solved and the advantageous effects can be obtained.

REFERENCE SIGNS LIST

1 Information communication system
AP. Base station
WTA Wireless terminal apparatus
10,20 CPU
11,21 ROM
12,22 RAM
13,23 Wireless communication module
14 Wired communication module
24 Display

25 Storage
30*a*, 30*b* Data processing unit
40*a*, 40*b* MAC frame processing unit
50*a*, 50*b* Management unit
51*a*, 51*b* Link management information
52*a*, 52*b* Association processing unit
53*a*, 53*b* Authentication processing unit
60 Wireless signal processing unit.
70 Application execution unit
LM1, LM2 Link management unit

What is claimed is:

1. An access point comprising:

a first wireless signal processing unit including one or more processors;

a second wireless signal processing unit including one or more processors; and a link management unit, including one or more processors, configured to establish a multi-link with a first wireless terminal apparatus using the first wireless signal processing unit and the second wireless signal processing unit, wherein the link management unit is capable of setting the multi-link to a first operation mode wherein the link management unit is configured to set both the first wireless signal processing unit and the second wireless signal processing unit to an intermittent operation mode, and when the multi-link is set to the first operation mode and first data addressed to the first wireless terminal apparatus is input, the link management unit is configured to identify a link associated with a traffic identifier attached to the first data, and cause one of the first and second wireless signal processing units associated with the identified link to transmit a beacon signal including information indicating that the first data has been buffered.

2. The access point according to claim 1, wherein upon receiving a transmission request via the at least one wireless signal processing unit after causing the at least one wireless signal processing unit to transmit the beacon signal, the link management unit causes a wireless signal processing unit having received the transmission request to transmit the first data.

3. The access point according to claim 1, wherein the link management unit is capable of setting the multi-link to a second operation mode and sets the first wireless signal processing unit and the second wireless signal processing unit to an active mode and an intermittent operation mode, respectively, in the second operation mode, and when the multi-link is set to the second operation mode, second data addressed to the first wireless terminal apparatus is input, and a traffic identifier added to the second data associated with the first wireless signal processing unit and the second wireless signal processing unit, the link management unit causes the first wireless signal processing unit to transmit the second data.

4. The access point of claim 1, further comprising:

a third wireless signal processing unit including one or more processors; and a fourth wireless signal processing unit including one or more processors, wherein the link management unit establishes a multi-link with a second wireless terminal apparatus using the third wireless signal processing unit and the fourth wireless signal processing unit, and when data addressed to the second wireless terminal apparatus has not been input to the link management unit when the beacon signal is transmitted, the beacon signal includes information indicating that data addressed to the second wireless signal processing unit has not been buffered.

5. A wireless terminal apparatus comprising:

a first wireless signal processing unit including one or more processors;

a second wireless signal processing unit including one or more processors; and a link management unit, including one or more processors, configured to establish a multi-link with an access point using the first wireless signal processing unit and the second wireless signal processing unit, wherein the link management unit is capable of setting the multi-link to a first operation mode wherein the link management unit is configured to set both the first wireless signal processing unit and the second wireless signal processing unit to an intermittent operation, and when the multi-link is set to the first operation mode, the link management unit is configured to periodically set at least one wireless signal processing unit of the first wireless signal processing unit and the second wireless signal processing unit to a state in which wireless signal reception is possible, and when the at least one wireless signal processing unit receives a beacon signal including information indicating that data addressed to a subject station has been buffered from the access point, the information comprising a terminal identifier of the wireless terminal apparatus, the link management unit is configured to determine a link assigned to the data based on the wireless signal processing unit having received the beacon signal, and the wireless signal processing unit having received the beacon signal is configured to transmit a transmission request for data to the access point.

6. The wireless terminal apparatus according to claim 5, wherein the transmission request is generated by the link management unit.

7. The wireless terminal apparatus according to claim 5, wherein the transmission request is generated by the wireless signal processing unit having received the beacon signal, and the information is not transmitted from the wireless signal processing unit to the link management unit.

8. The wireless terminal apparatus according to claim 5, wherein the link management unit is configured to cause the wireless signal processing unit having received the beacon signal to transmit a signal notifying the start of a power saving mode when data corresponding to the transmission request is successfully received from the access point, and sets the wireless signal processing unit having received the beacon signal to a state in which wireless signal reception is not possible upon receiving an acknowledgment for the signal.

9. The access point according to claim 1, wherein the information indicating that the first data has been buffered comprises a terminal identifier (AID) of the first wireless terminal apparatus and a partial virtual bitmap (PVB) indicating a presence of buffered data for the terminal identifier.

10. The access point according to claim 1, wherein the link management unit is configured to store link management information that maps the traffic identifier to at least one of the first wireless signal processing unit or the second wireless signal processing unit, and wherein the link management unit is configured to identify the link by referring to the link management information.

11. The access point according to claim 1, wherein the first wireless signal processing unit is configured to operate on a first frequency band and the second wireless signal processing unit is configured to operate on a second frequency band different from the first frequency band, and wherein the link associated with the traffic identifier is allocated to the first frequency band or the second frequency band based on a type of traffic and an amount of data corresponding to the traffic identifier.

12. The access point according to claim 1, wherein when the multi-link is set to the first operation mode and the first data is input, the link management unit is configured to determine whether the first data is Real Time Applications (RTA) data, and when the first data is determined to be the RTA data, the link management unit is configured to change the first wireless signal processing unit and the second wireless signal processing unit to a Target Wake Time (TWT) operation mode instead of transmitting the beacon signal.

13. The access point according to claim 1, wherein after the first data is successfully transmitted to the first wireless terminal apparatus, the link management unit is configured to receive a power saving mode notification signal from the first wireless terminal apparatus, update link management information based on the power saving mode notification signal, and transmit a power saving mode acknowledgment to the first wireless terminal apparatus.

14. The wireless terminal apparatus according to claim 5, wherein the information further comprises a partial virtual bitmap (PVB) indicating a presence of buffered data for the terminal identifier, and wherein the link management unit is configured to confirm whether the data addressed to the wireless terminal apparatus is buffered based on the terminal identifier and the partial virtual bitmap.

15. The wireless terminal apparatus according to claim 5, wherein the link management unit is configured to store link management information that maps a traffic identifier to at least one of the first wireless signal processing unit or the second wireless signal processing unit, and wherein the link management unit is configured to determine the link assigned to the data by referring to the link management information.

16. The wireless terminal apparatus according to claim 5, wherein when the beacon signal is received by both the first wireless signal processing unit and the second wireless signal processing unit, the link management unit is configured to transmit the transmission request using a wireless signal processing unit among the first wireless signal processing unit and the second wireless signal processing unit having a highest received power of the beacon signal.

17. The wireless terminal apparatus according to claim 5, wherein after data corresponding to the transmission request is received, the link management unit is configured to determine whether error correction of the data was successful, and when the error correction fails, cause the wireless signal processing unit having received the beacon signal to repeatedly transmit the transmission request until the data is successfully received.

* * * * *